United States Patent [19]

Kan et al.

[11] 4,302,098

[45] Nov. 24, 1981

[54] PRINTING APPARATUS

[75] Inventors: Yasuhito Kan, Urawa; Yoshimasa Kimura, Kawasaki; Masato Ishida, Yokohama; Koichi Miyamoto, Tokyo; Yoshikuni Tohyama, Yokohama, all of Japan

[73] Assignee: Canon Kabushiki Kaisha, Tokyo, Japan

[21] Appl. No.: 93,867

[22] Filed: Nov. 13, 1979

Related U.S. Application Data

[63] Continuation of Ser. No. 896,580, Apr. 14, 1978, abandoned.

[30] Foreign Application Priority Data

| | | | |
|---|---|---|---|
| Apr. 19, 1977 | [JP] | Japan | 52-45416 |
| Apr. 19, 1977 | [JP] | Japan | 52-45417 |
| Apr. 19, 1977 | [JP] | Japan | 52-45418 |
| Mar. 1, 1978 | [JP] | Japan | 53-23217 |

[51] Int. Cl.$^{3}$ ............................................ G03B 27/52

[52] U.S. Cl. .................................. 355/55; 355/35 H; 355/8; 355/14 R

[58] Field of Search ..................... 355/3 R, 14, 55-57, 355/60, 35 H, 8

[56] References Cited

U.S. PATENT DOCUMENTS

| | | | |
|---|---|---|---|
| 3,792,926 | 2/1974 | Knuchtel | 355/60 X |
| 3,950,090 | 4/1976 | Washio et al. | 355/8 |

FOREIGN PATENT DOCUMENTS

| | | |
|---|---|---|
| 50-93442 | 7/1975 | Japan . |
| 52-10142 | 1/1977 | Japan . |

*Primary Examiner*—Richard L. Moses

*Attorney, Agent, or Firm*—Fitzpatrick, Cella, Harper & Scinto

[57] ABSTRACT

Apparatus for printing reproduction copies of an original image or recording such original image on an image recording member, is provided with a device for determining whether the image to be recorded conforms in size to the image recording member. The apparatus provides an indication to the operator of the apparatus when non-conformance is detected.

52 Claims, 30 Drawing Figures

FIG. 1C-A
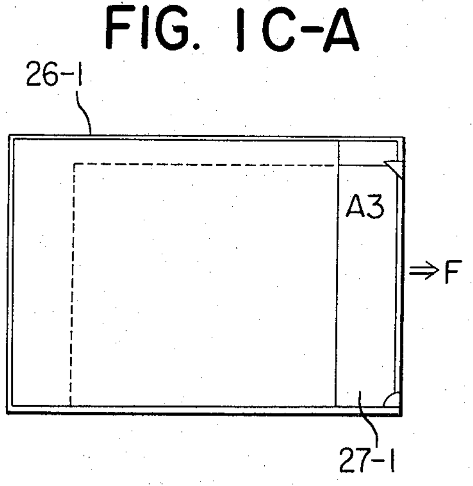
FIG. 1C-B
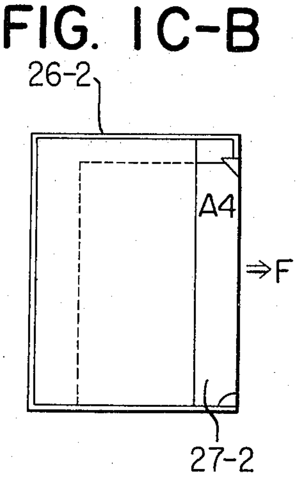
FIG. 4B
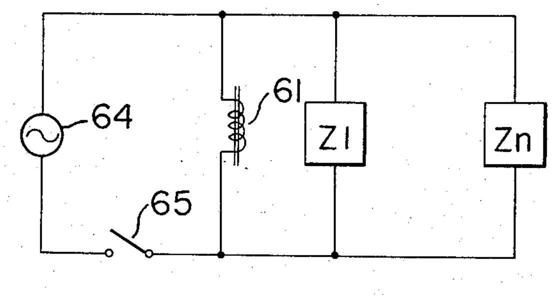
FIG. 5
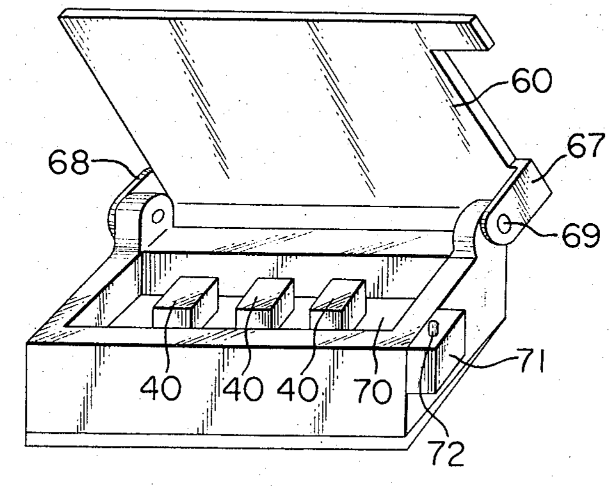

FIG. 6A3
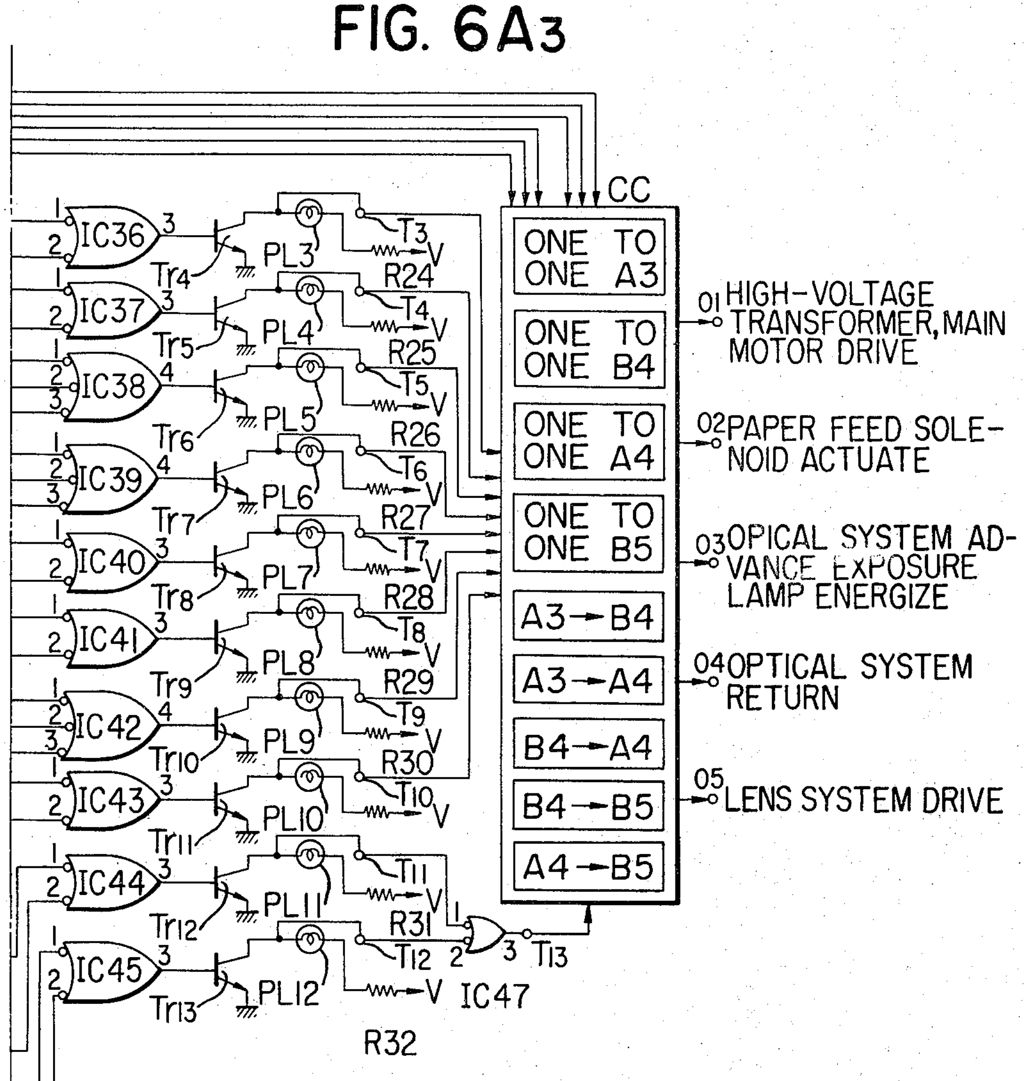
FIG. 6A
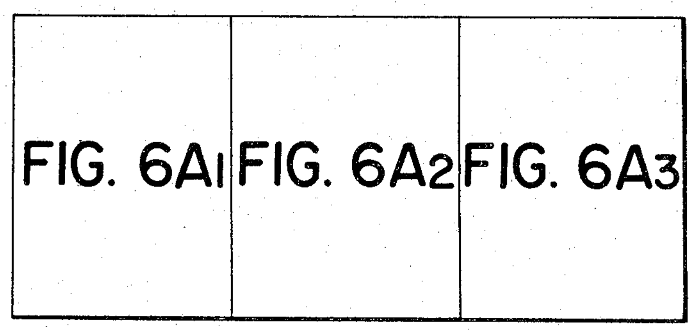

FIG. 6A1
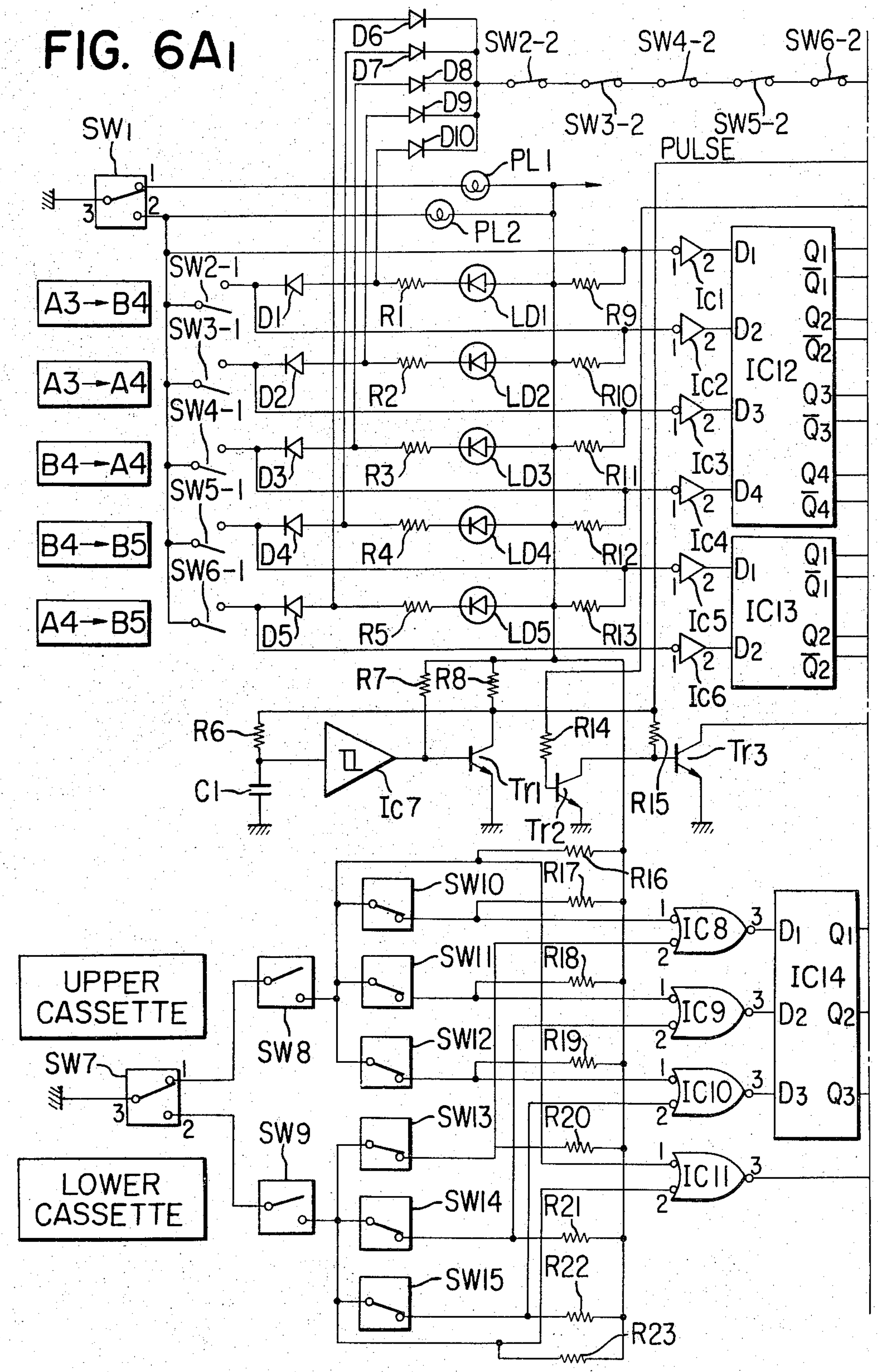

FIG. 6A2
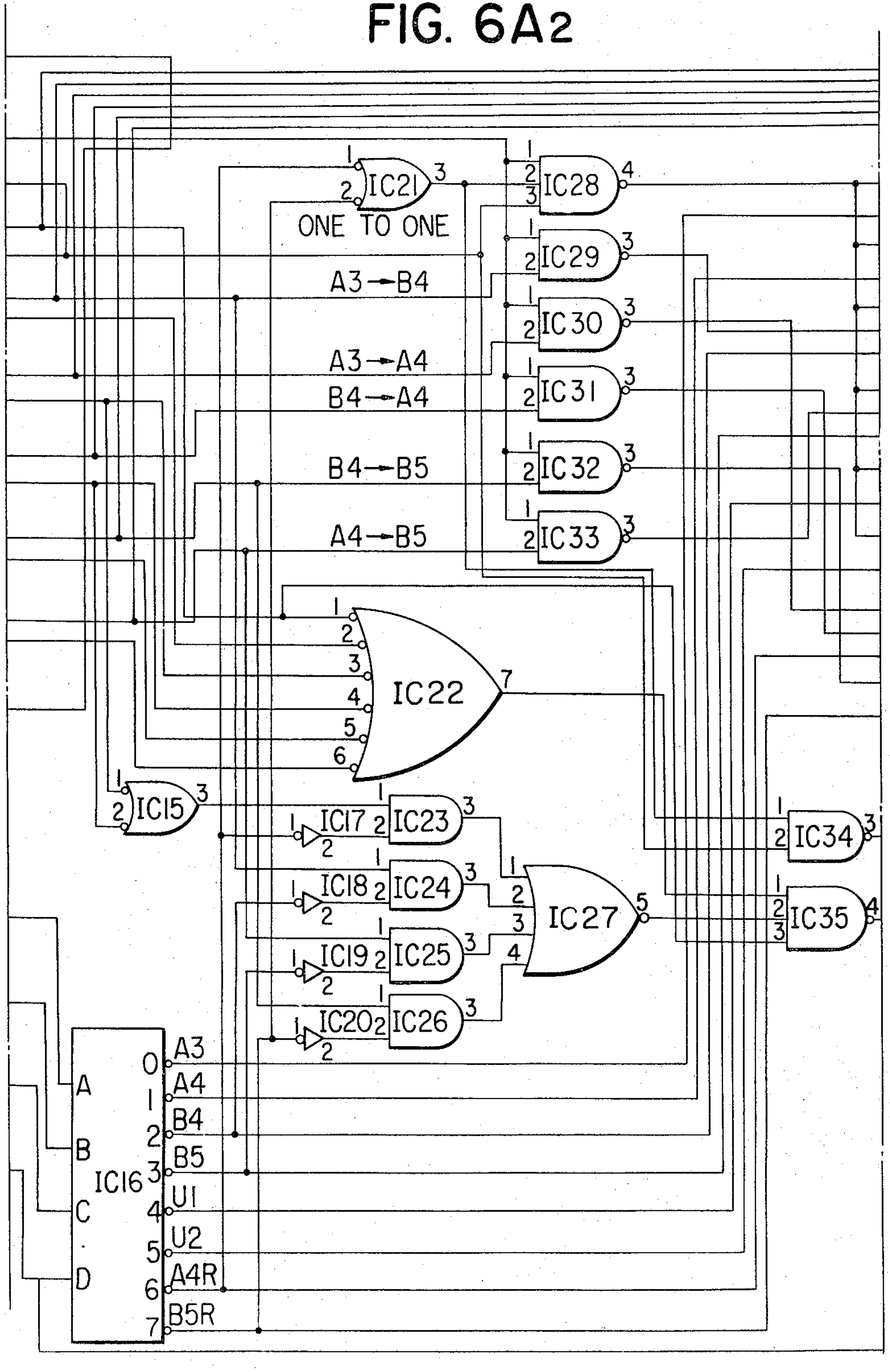

FIG. 6C6

FIG. 6C1
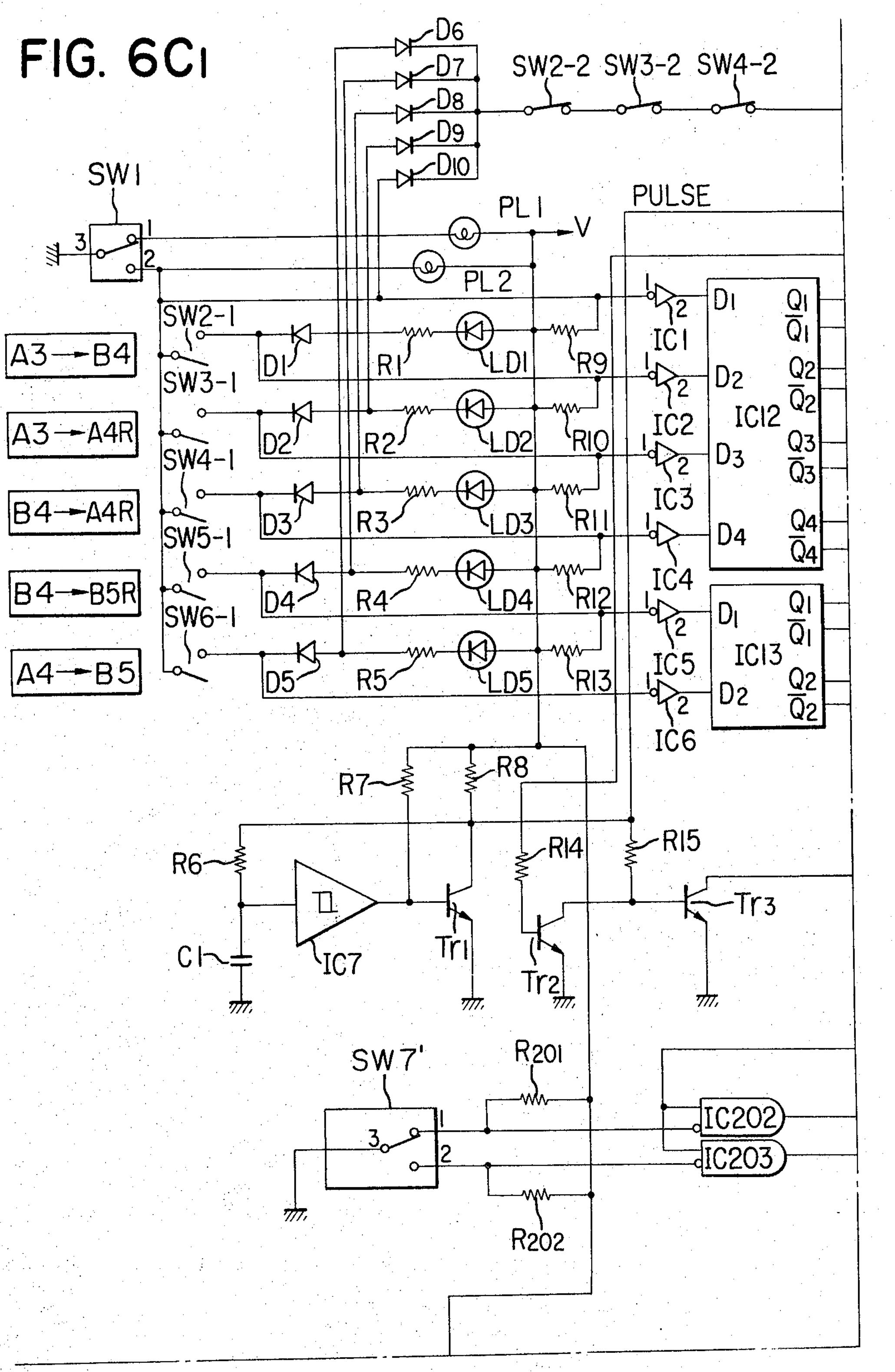

FIG. 6C2
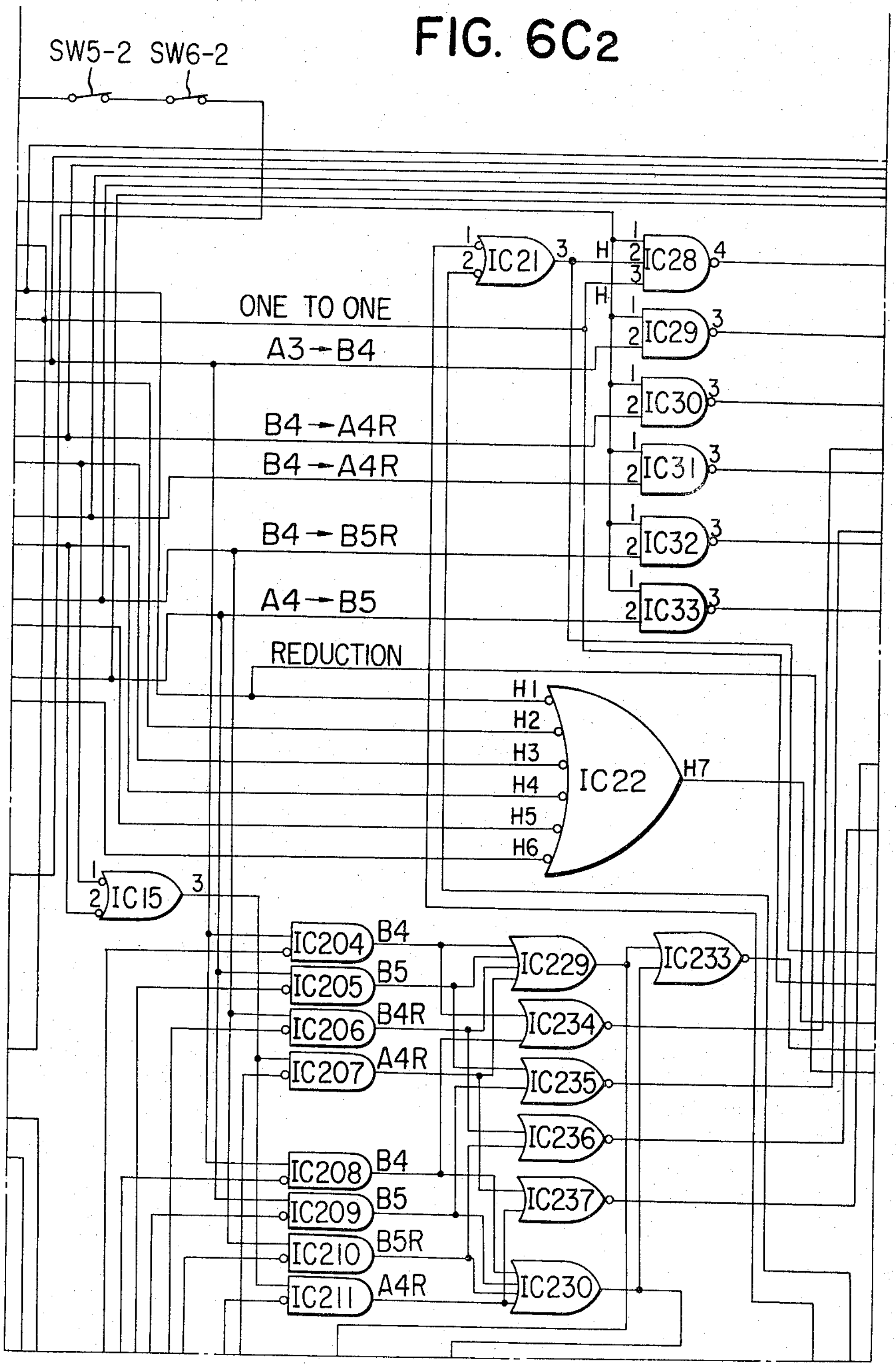

FIG. 6C3
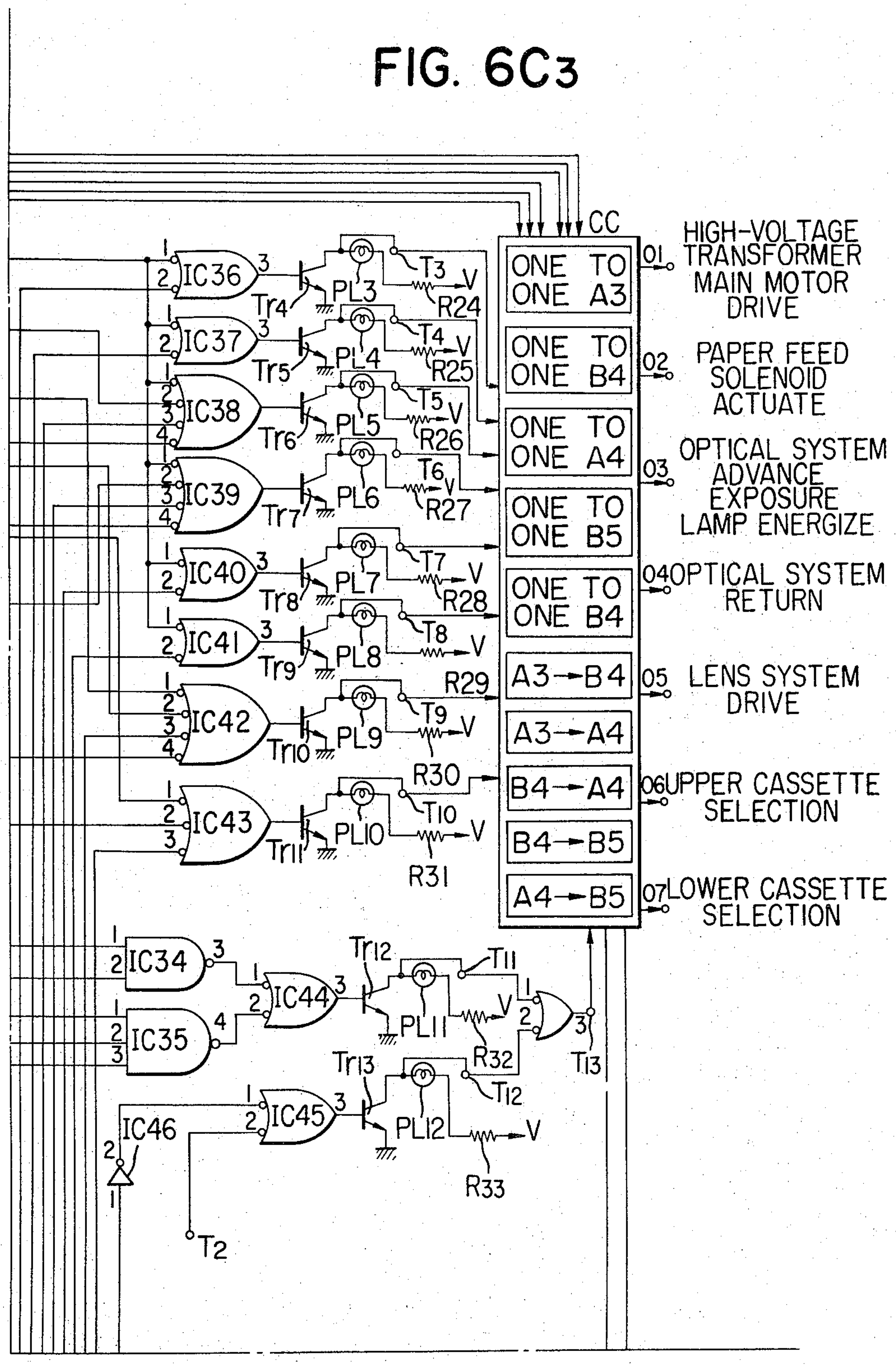

FIG. 6C4
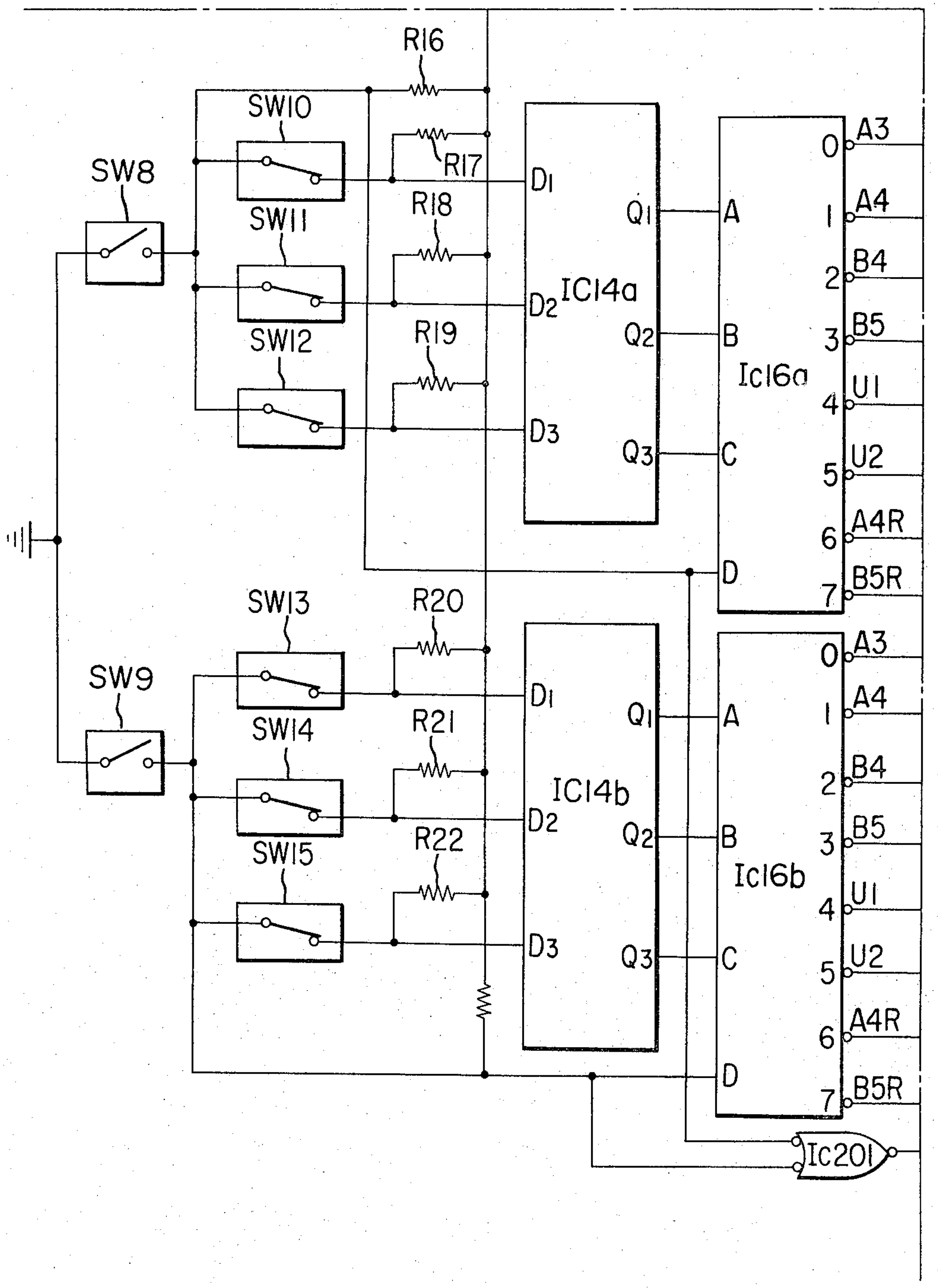

FIG. 6C5
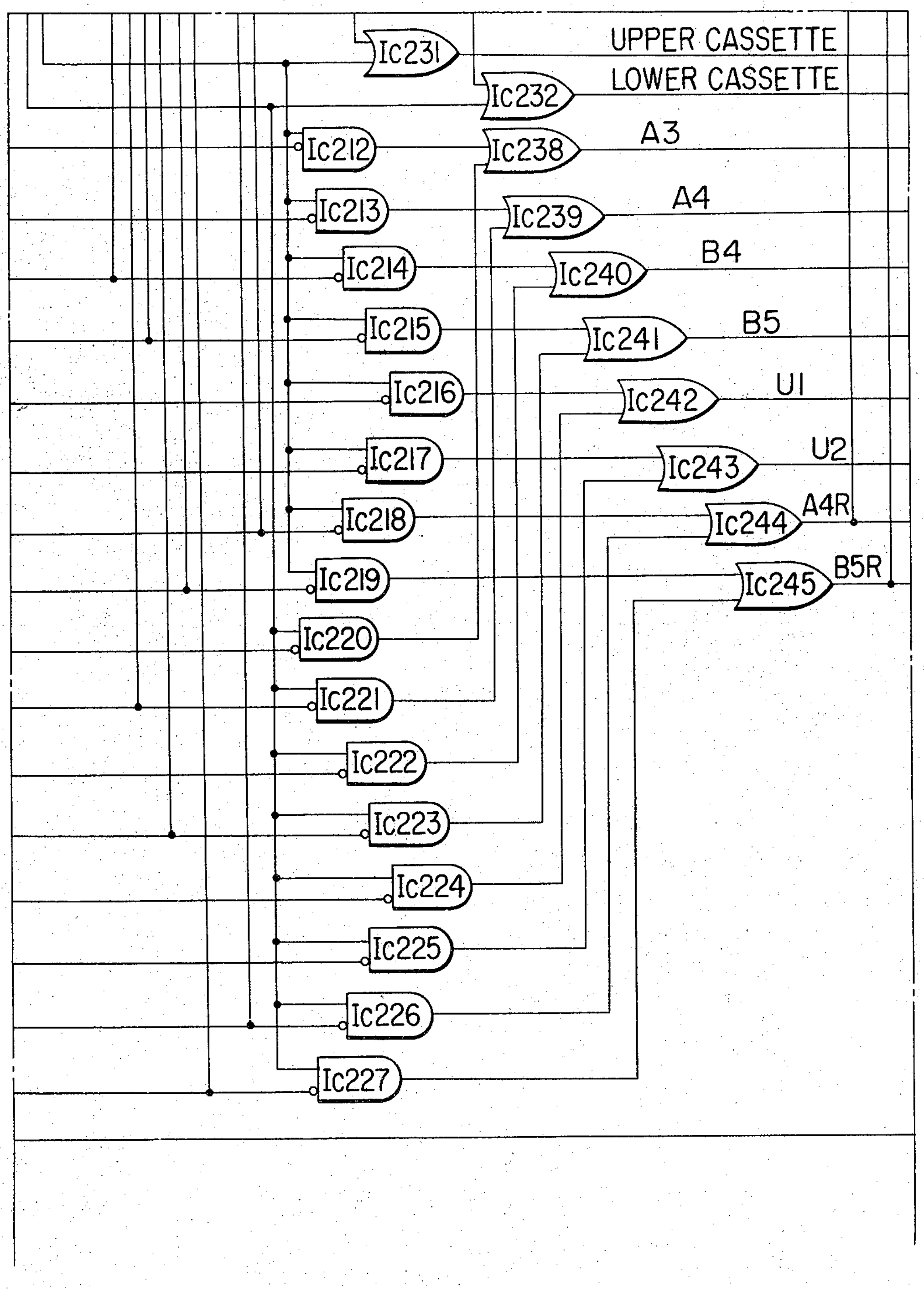

PRINTING APPARATUS

This is a continuation of application Ser. No. 896,580, filed Apr. 14, 1978, now abandoned.

BACKGROUND OF THE INVENTION

1. Field of the Invention

This invention relates to a recording apparatus which performs recording of an original image on an image recording member. More specifically, the invention is concerned with a recording apparatus which is capable of determining whether the image to be recorded (recording image) is well matched in size with the image recording member, and which notifies an operator of the apparatus to that effect, if they are not well matched.

2. Description of the Prior Art

While conventionally known recording devices function to indicate a size and a shape of the image recording member, they do not have a function of indicating a size and shape of an original image to be recorded on the image recording member. (Throughout the present specification, the term "shape of the image" connotes both its size and its direction of lay-out). As the result, an operator of the device is required to compare by himself the shape of the recording image with that of the image recording member so as to make proper size-adjustment between both. For instance, in a recording apparatus having a function of carrying out the image recording by reducing or enlarging the size of the original image (i.e., magnification changing function), such size comparison has been very troublesome. That is, in case the image recording member is well conformed in shape with the recording image, the operator, after the comparison, instructs the recording apparatus to perform the image recording operation, while, in case both are non-conformed, he must change the image recording member to such shape that is conformed to the shape of the original image.

The changing operation as above-described, however, often brings about errors in the image recording, since selection of the image recording member is very complicated.

Further, conventional recording apparatus having the magnification changing function have been rather difficult to handle for the operator, because the operating panel of the device is fully occupied by various sorts of dials, buttons, and so on such as "recording start button", "recording stop button", "recording sheet number setting dial", "image density adjusting dial", and, in addition, "magnification changing instruction means" which designates magnification of the original image to be changed, or "magnification changing limiting means" which establishes the image size after the magnification changing, and others.

Furthermore, in the conventional electronic image reproduction apparatuses utilizing a photo-sensitive drum, even if they possess the magnification changing function, the direction in which the original image is to be laid on an image mounting table is limited to its lengthwise direction alone, and the original image placed on the image mounting table is scanned in its lengthwise direction. Even in case the length of the original image in its longitudinal direction is shorter than the breadth of the photosensitive drum, the original should be scanned, without exception, in the lengthwise direction thereof, hence the time required for the scanning operation becomes inevitably prolonged.

SUMMARY OF THE INVENTION

In view of the above-described drawbacks with the conventional recording apparatuses, it is an object of the present invention to provide an improved image recording apparatus capable of readily selecting an adequate image recording member, which is so constructed that, when the recording image is not well conformed in shape with the image recording member, a positive indication is given to the operator of the apparatus as to which size recording member will be well matched.

It is another object of the present invention to provide an improved image recording apparatus which is so constructed that the magnification change limiting means, which is used only when the magnification change recording is to be carried out, is covered with a masking member, and the magnification changing recording is selected by opening this masking member with simultaneous exposure of the abovementioned magnification change limiting means.

It is still another object of the present invention to provide an improved image recording apparatus, in which the image recording members of a same size may travel within the recording apparatus in either lengthwise or breadthwise direction depending on whether the operation is for the one-to-one recording or the magnification change recording, so that the recording speed in one-to-one image recording, the mode which is most frequently used, may be maintained at high speed.

It is other object of the present invention to provide an improved image recording apparatus which utilizes any designated one of a plurality of cassette accommodating means which accommodate therein the image recording member at the time of the one-to-one recording, and utilizes recording member designating means which designates a shape of the appropriate image recording member at the time of the magnification change recording.

It is still other object of the present invention to provide an improved image recording apparatus which prohibits operations of the apparatus, when the image recording member is not accommodated within the apparatus.

BRIEF DESCRIPTION OF THE DRAWINGS

FIGS. 1C-A and 1C-B are respectively top plan views of a cassette, in which image transfer sheets are accommodated;

FIG. 4B is a circuit diagram for such size-reduction operating section;

FIG. 5 is again a perspective view of a further embodiment of the size-reduction operating section;

FIG. 6A is a first embodiment of the circuit diagram for the first reproduction apparatus;

DETAILED DESCRIPTION OF PREFERRED EMBODIMENTS

Figure 1A:
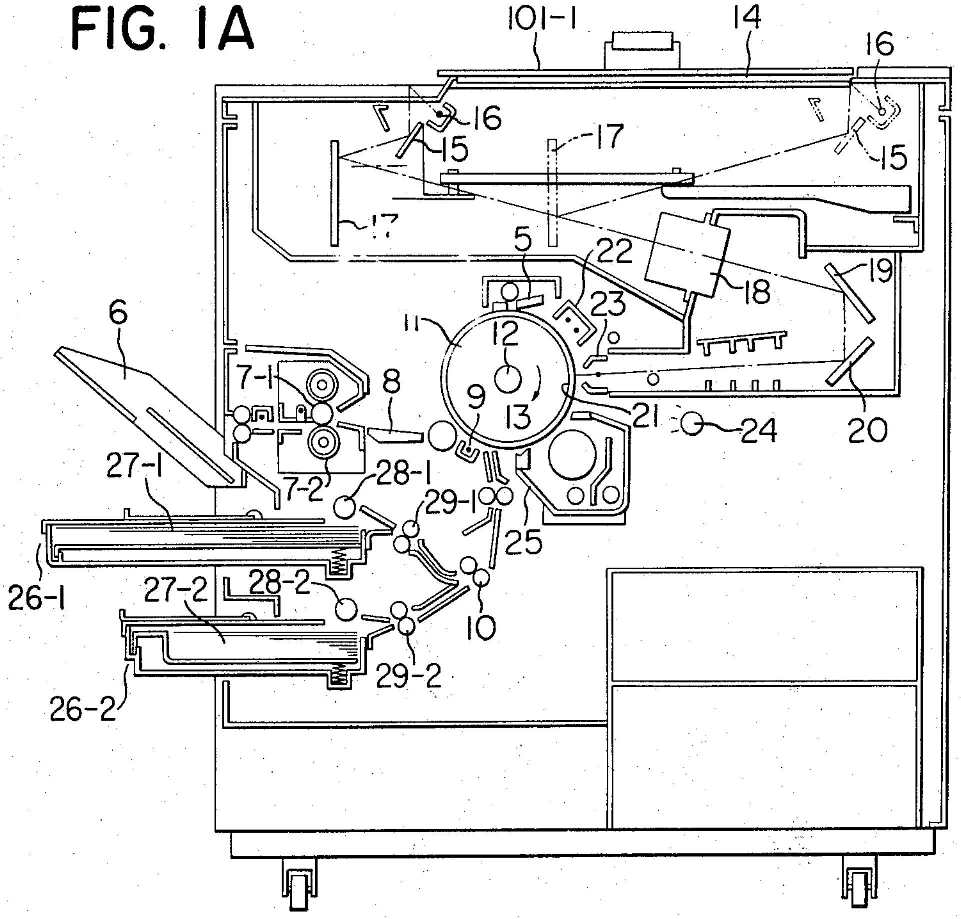
FIG. 1A is a side view in cross-section showing a first embodiment of the image reproduction apparatus, to which the present invention is applied.

As shown in FIG. 1A, the surface of a drum 11 consists of a three-layered structure utilizing a Cds photoconductive body. The drum 11 is axially supported on a shaft 12 in a rotatable manner, and starts its rotation in the direction of an arrow 13 in accordance with a copying instruction.

When the drum 11 rotates to a predetermined position, an original image placed on a glass plate 14 for mounting the original image is illuminated by an illuminating lamp 16 integrally constructed with a first scanning mirror 15, the reflected light of which is scanned by the first scanning mirror 15 and a second scanning mirror 17. The first scanning mirror 15 and the second scanning mirror 17 move at a speed ratio of 1:½, whereby the image scanning can be done with the light path length in front of a lens 18 being maintained constant.

After the reflected light image passes through the lens 18 and a third mirror 19, it is focussed on the drum 11 at an exposure section 21 through a fourth mirror 20.

The drum 11 is then charged ("+", for example) by a primary charger 22, after which it is slit-exposed on its exposure section 21 with the image irradiated by the illuminating lamp 16.

At the same time, (that is, during the slit-exposure) electric charges are removed from the drum by an alternating current discharger or a discharger having an opposite polarity to that of the primary electric charge (e.g. the negative polarity). Such discharger is carried out by a charge removing means 23, thereafter an electrostatic latent image of a high image contrast is formed on the drum 11 by an overall exposure by an overall exposure lamp 24. The electrostatic latent image thus formed on the photosensitive drum 11 is then rendered visible, by a developing means 25, as a toner image. Image transfer paper 27-1 or 27-2 within a cassette 26-1 or 26-2 is forwarded into the reproduction apparatus by means of a paper feeding roller 28-1 or 28-2, after which it is sent out in the direction of the photosensitive drum 11 with an approximate timing taken at a first register roller 29-1 or 29-2 and with the accurate timing taken at a second register roller 10.

Subsequently, while the image transfer paper 27 is passing between the image transfer charger 9 and the photosensitive drum 11, the toner image on the drum 11 is transferred onto the image transfer paper.

Upon completion of the image transfer operation, the image transfer paper is guided to a conveyor belt 8, and further guided to a pair of image-fixing rollers 7-1 and 7-2 where the image is fixed under pressure and heat, after which it is discharged into a tray 6.

The surface of the photosensitive drum 11 is cleaned after the image transfer, by means of a cleaning device 5 consisting of a resilient wiping blade so as to be ready for the subsequent reproduction cycle.

The reproduction apparatus shown in FIG. 1A is capable of forming on the photosensitive drum 11, a reduced scale image of the original image placed on the original mounting table 14 which is made of glass. In order to form such image in a reduced scale, a position of the abovementioned lens 18 is varied in accordance with a ratio for the scale reduction, and, at the same time, speeds of the first scanning mirror 15, the lamp 16, and the second scanning mirror are caused to vary. Since, however, such mechanism is already well known, detailed explanations thereof will be dispensed with. For the detailed mechanism, reference should be made to U.S. Pat. No. 3,614,222.

Figure 1B:
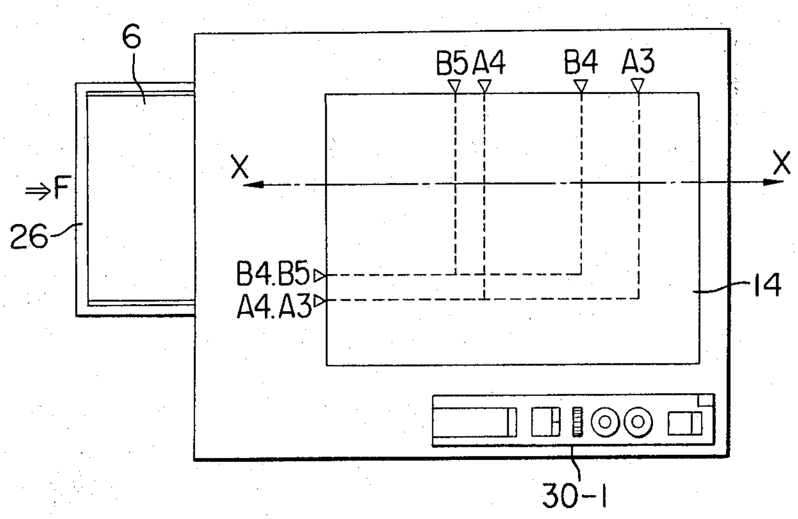
FIG. 1B is a top plan view of the reproduction apparatus shown in FIG. 1A.

FIG. 1B shows the top plan view of the reproduction apparatus shown in FIG. 1A. It particularly shows the direction, in which the original image is placed on the original mounting table 14. That is to say, in the reproduction apparatus shown in FIG. 1A, the original image is so placed that, in the case of its being in A-3 size (11.7 in.×16.5 in.) and B-4 size (10.1 in.×14.3 in.), the lengthwise direction of the original image may coincide with the moving direction (x) of the optical system, and, in the case of A-4 size (8.3 in.×11.7 in.) and B-5 size (7.2 in.×10.1 in.) the breadthwise direction of the original image may coincide with the moving direction of the optical system.

With such lay-out of the original image, when the one-to-one reproduction is to be carried out, the image transfer paper 27-1 in A-3 and B-4 size is so placed in the cassette 26-1 that the longitudinal direction of the paper 27-1 may coincide with the forwarding (feeding) direction F thereof as shown in FIG. 1C-A, while the image transfer paper 27-2 in A-4 and B-5 size is so placed in the cassette 26-2 that the breadthwise direction of the paper may coincide with the forwarding direction F thereof as shown in FIG. 1C-B.

Thus, in the reproduction apparatus of a type, wherein the original image can be placed in both lengthwise and breadthwise direction thereof, in order to accelerate the reproduction speed at the time of the one-to-one magnification reproduction, there may occur such a situation that the image to be reproduced sprawls out of the area of the image transfer paper at the time of the reproduction in reduced scale. For instance, when an original image in A-3 size is to be reduced onto image transfer paper of A-4 size, or an original in B-4 size is to be reduced onto B-5 size paper, if the image transfer paper, on which the image informations in a reduced scale are to be transferred, is placed breadthwise as shown in FIG. 1C-B, there will be transferred a reduced image of the informations in A-4 size on the image transfer paper in its lengthwise direction, whereby a part of the image information will not appear on the image transfer paper.

In order therefore to avoid such inconvenience, the embodiment of the apparatus according to the present invention is so constructed that a cassette, in which even the image transfer paper in B-5 and A-4 size is placed in its lengthwise direction as that shown in FIG.

1C-A, is provided so that when the original image in A-3 or B-4 size is to be reduced to A-4 size, or the original image in B-4 size is to be reduced to B-5 size reproduction copy, a cassette, in which the transfer paper is placed lengthwise, may be used. In this way, a satisfactory scale-reduction function is given to the reproduction apparatus without lowering the reproduction speed for the one-to-one magnification reproduction which is most frequently used.

In other words, in the reproduction apparatus to which the present invention is applied, image transfer papers of the same size are conveyed through a paper feeding path within the reproduction apparatus in mutually different right-angle alignment thereof in both cases of one-to-one reproduction and scale-reduced reproduction.

Figure 2A:
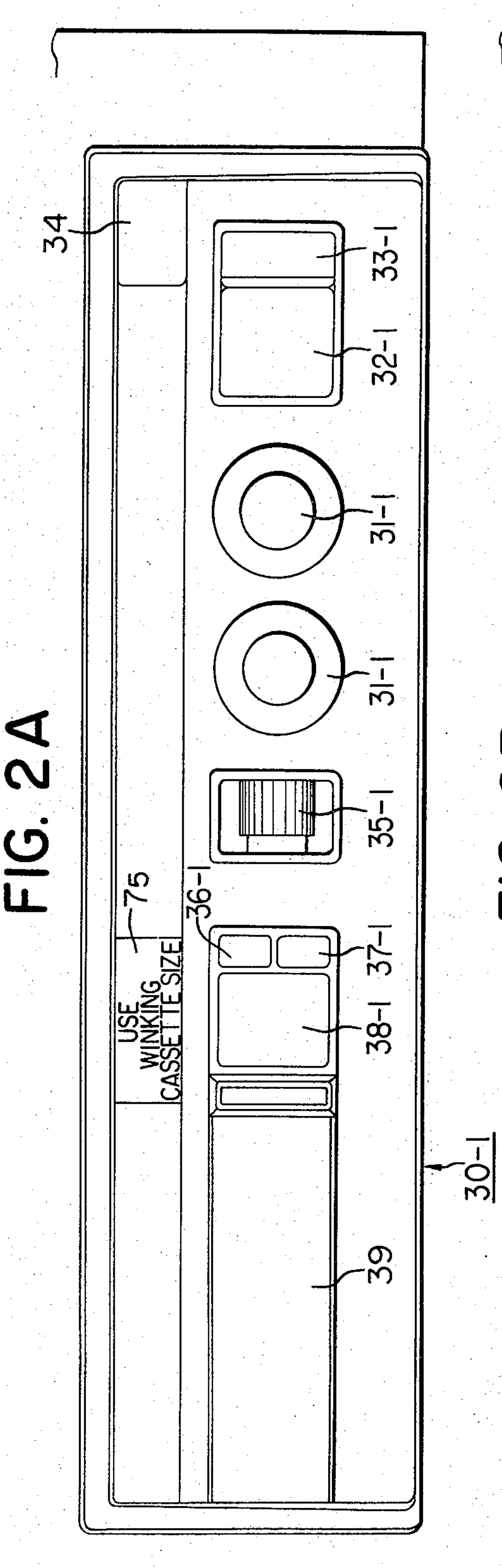
FIGS. 2A and 2B are respectively top plan views of the operating panel for the reproduction apparatus shown in FIGS. 1A and 1B.
Figure 2B:
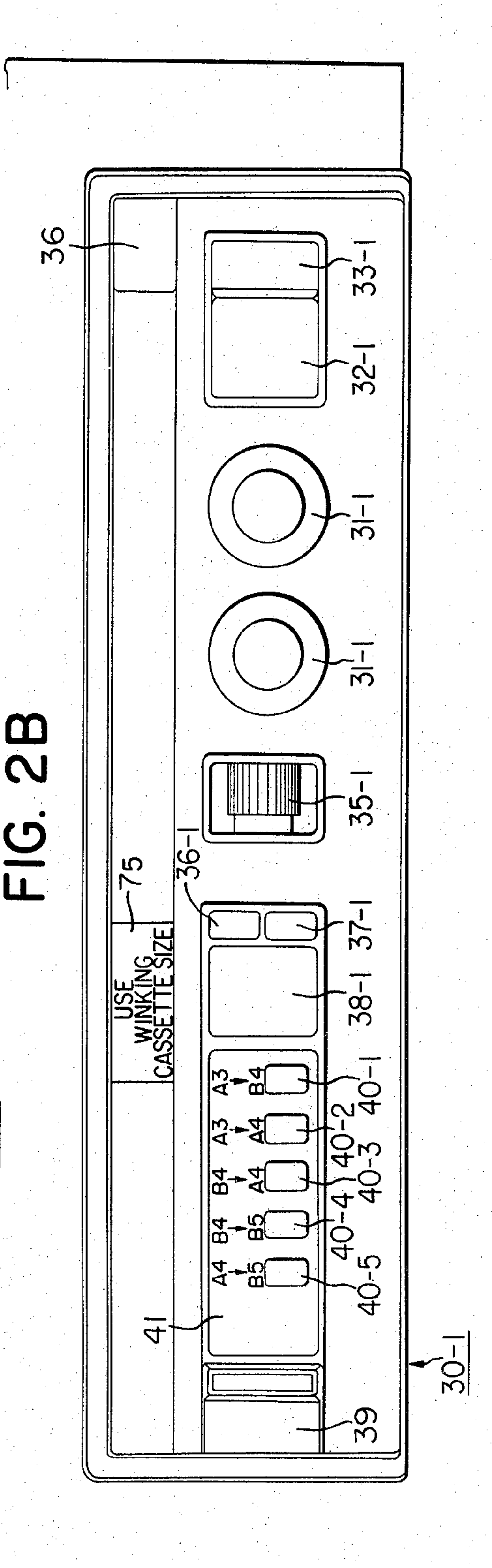

FIGS. 2A and 2B show further details of the operating panel 30-1 of the reproduction apparatus shown in FIG. 1B, in which 31-1 refers to a dial for setting the number of sheets of the reproduction copy, 32-1 denotes a copy button which instructs reproduction of the image in the predetermined numbers of sheets, 33-1 designates a copy button which instructs the advance of a single sheet of reproduction copy irrespective of the set number of sheets of reproduction, 34 indicates a stop button which instructs stoppage of the reproduction operation, 35-1 is a density adjustment dial which adjusts density of an image to be formed on the image transfer paper, 36-1 and 37-1 designate respectively cassette instruction means, in which 36-1 is a button for instructing image transfer paper to be taken out of the cassette 26-1 loaded on the upper cassette mount of the reproduction apparatus in FIG. 1A, and 37-1 is a button for instructing image transfer paper to be taken out of the cassette 26-2 loaded on the lower cassette mount of the reproduction apparatus in FIG. 1A. The size of the image transfer paper accommodated in the cassette and to be selected by the button 36-1 or 37-1 is indicated at an indicator section 38-1.

At one portion of this operating panel, there is formed a recessed part 41, in which there are provided a plurality of scale-reduction operation buttons 40-1 to 40-5 which function as a manual selection means for instructing the shape of the image after the scale reduction, or which function as a means for designating the abovementioned image recording member; or which function as a means for limiting the magnification change. Thus, the buttons 40-1 to 40-5 possess the function of manual selection means which instructs the shape of the image to be recorded, the function of designating the image recording member, and the function of limiting a plurality of magnifications to any one of them. Over the recess 41, there is provided a slidable masking member 39 to cover the size-reduction operation section.

The masking or cover member 39 entirely covers the size-reduction operation buttons 40-1 to 40-5 as shown in FIG. 2A to make them inaccessible, or it slides back to expose these buttons to the outside so as to make them operable. Also, the masking member 39 may be made of transparent or semi-transparent glass or plastic material so that the presence of the buttons 40-1 to 40-5 can be seen even when the recessed portion is entirely covered.

Figure 3A:
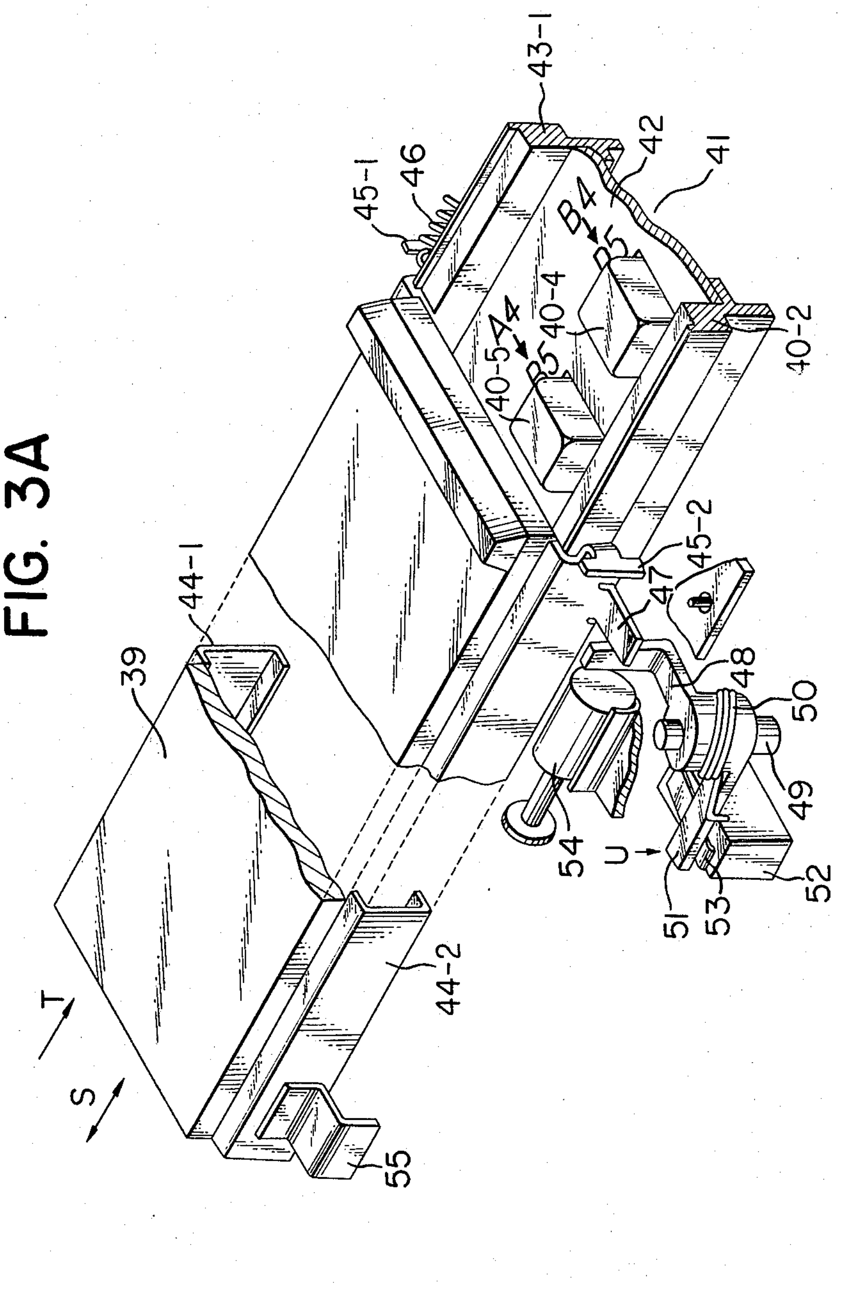
FIGS. 3A and 3B are respectively perspective and side-elevational views indicating a size-reduction operating section in the operating panel shown in FIGS. 2A and 2B.
Figure 3B:
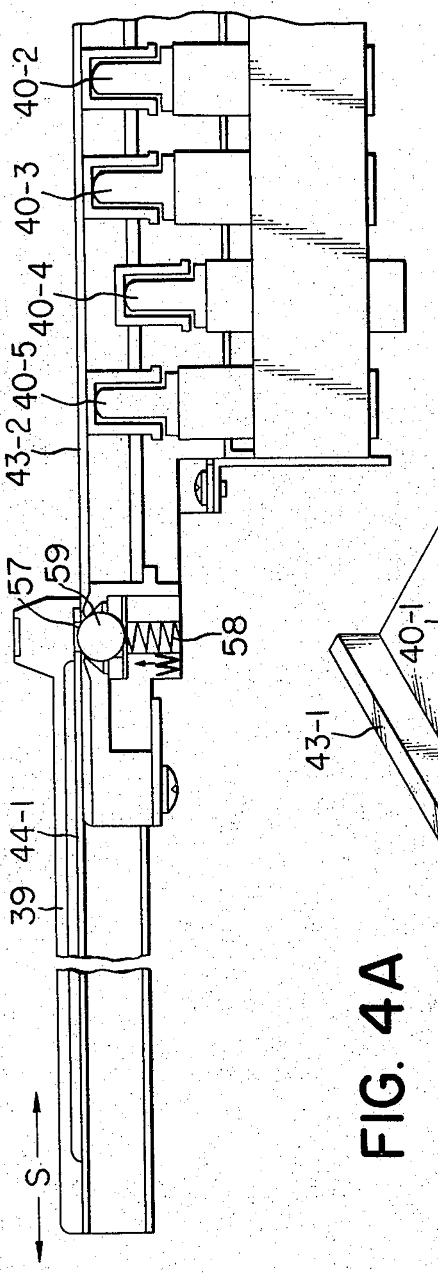

FIGS. 3A and 3B respectively show the details of the size-reduction operation section. In one part of a bottom plate 42 constituting the bottom part of the recess 41, there are disposed the above-mentioned size-reduction operating buttons 40-5 to 40-1 (the buttons 40-3 to 40-1 not being shown). On both sides of the bottom plate 42, there are disposed rails 43-1 and 43-2. Thus, the recess 41 is formed with this bottom plate 42 and the rails 43-1 and 43-2. At both sides of the masking or cover member 39, there are fixed angles 44-1 and 44-2 to hold the rails 43-1 and 43-2. The cover 39 can be moved in the arrowed direction S in a freely slidable manner along the rails 43-1 and 43-2. On one part of the angles 44-1 and 44-2, there are fixedly provided pawls 45-1 and 45-2. Between these pawls 45-1 and 45-2 and a base plate (not shown), there are expanded springs 46 so that the cover 39 may always be urged in its closing direction (shown by an arrow T). On one part of the rail 44-2, there is further provided a pawl 47. By moving the cover 39 in the direction opposite to the arrow direction T, to cause it to open, an arm 48 which is rotatably held on a shaft 49 is rotated by this pawl 47 in the counter-clockwise direction against the force of a spring 50.

A lever 51 is integrally formed with the arm 48, and the counter-clockwise rotation of the lever energizes an operating lever 53 of a micro-switch 52 to drive this microswitch 52 which provides an output signal. In other words, when the cover 39 is in its open state as shown in FIG. 2B, the operating lever 53 of the switch 52 is depressed downward by the lever 51, whereby a contact a (not shown) is in contact with a contact piece c (also not shown). On the other hand, when the cover 39 is in a state other than that shown in FIG. 2B (e.g., a state as shown in FIG. 2A), the operating lever 53 is not depressed downward, hence the contacts a and c are not in a state of mutual contact. 54 shows a damper, and 55 a projection fixed on one part of the rail 44-2. When the cover 39 is pulled by the spring 46 to its closing direction, it is closed gradually by the action of the damper 54 after the projection 55 and the damper 54 have contacted each other.

Figure 4A:
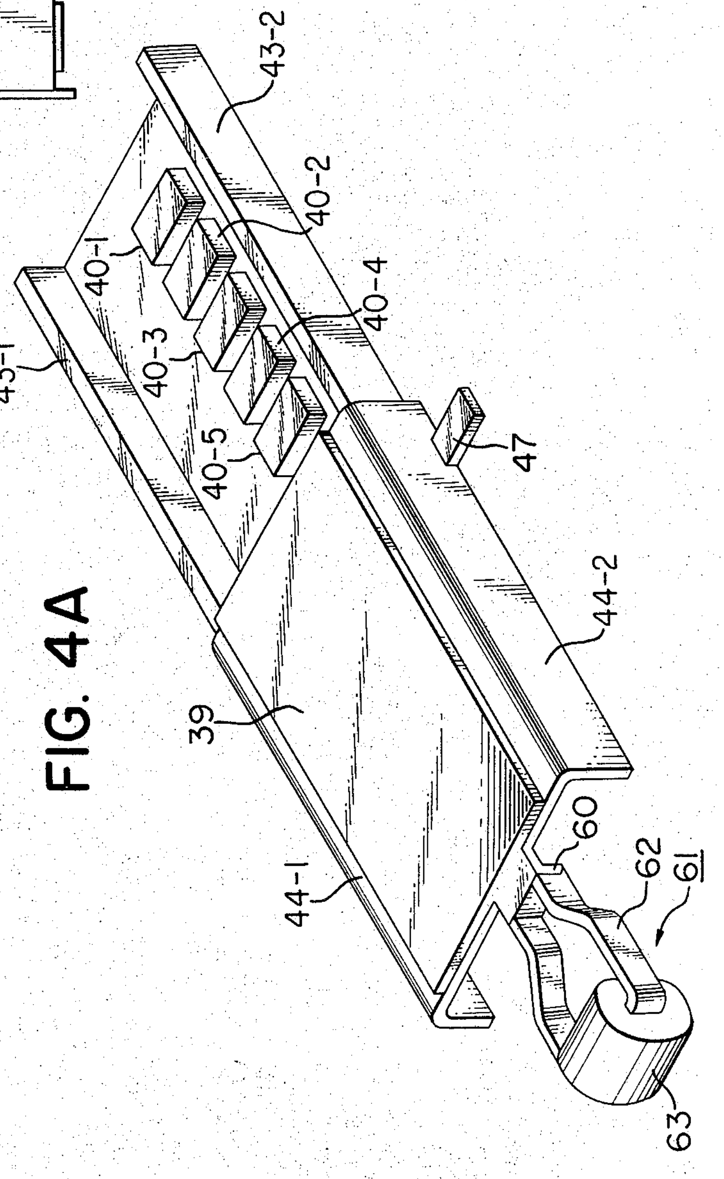
FIG. 4A is also a perspective view of a different embodiment of the size-reduction operating section.
Figure 6B:
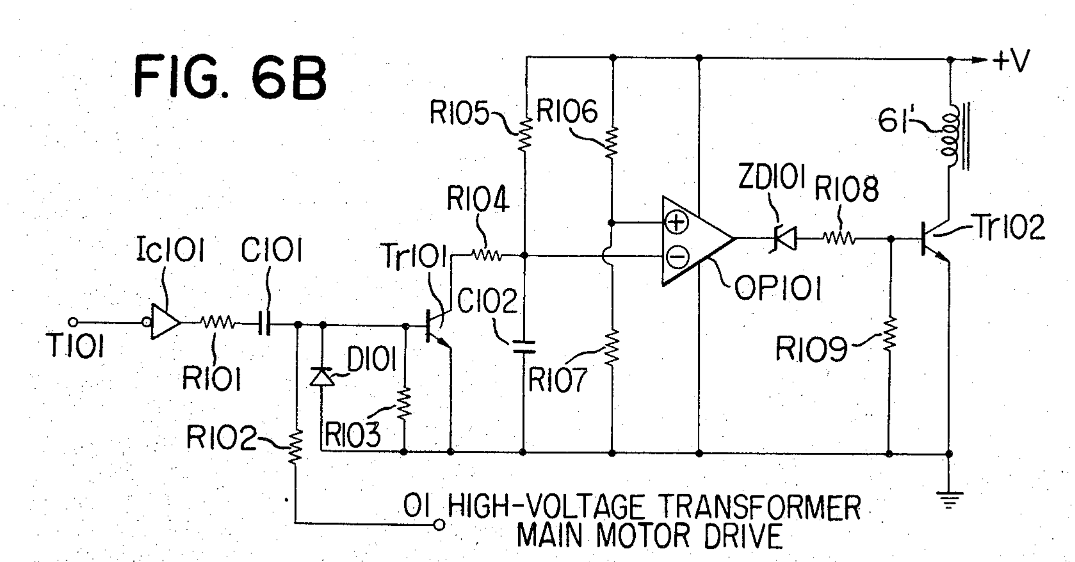
FIG. 6B is also a schematic circuit diagram for closing the cover, or masking member.

Although the cover 39 is constantly urged by the spring 46 in its closing direction as stated in the preceding, its open state is maintained by a click mechanism as shown in FIG. 3B. That is, in one part of the angle 44-1, there is formed a circular through-hole 57, while, at one part of the rail 43-2, there is disposed a ball 59 energized in an arrow direction W by a spring 58. In this way, a part of the ball 59 is pushed into the through-hole 57 upon opening of the cover 39, whereby the cover is able to maintain its open state as shown in FIG. 3B against the tensile force of the spring 46. For a mechanism to maintain the cover in its open state, there may also be used an electromagnet as shown in FIG. 4A, which enables the cover to be closed under a certain particular condition of the reproduction apparatus. In more detail, a projected piece 60 made of metal material such as iron is fixedly provided at one end part of the cover 39, and an electromagnet 61 constructed with winding 63 wound around a core 62 is disposed at the extreme end of the projected piece 60 at a position where it is located in the open state of the cover. The winding 63 is inserted in parallel with loads Z1 . . . Zn constituting the reproduction apparatus with respect to a power source 64, as shown in FIG. 4B, whereby, when a power source switch 65 to control operations of the reproduction apparatus is once turned off, the cover is drawn by the spring 46 to its closure state. Also, by the use of a circuit as shown in FIG. 6B, it is possible to close the cover not only when the power source is turned off, but also when the copying operation does not start after the lapse of a certain definite time interval with the cover being opened: or, when the subsequent copying operation does not start even after lapse of a certain definite time interval, upon completion of copying operations for a predetermined number of sheets with the cover being opened. The operations of the circuit shown in FIG. 6B will be explained later.

In FIG. 4A, those portions not illustrated in the drawing are the same as those shown in FIG. 3A, and those portions having the same reference numerals consist of the same members in FIG. 3A.

As described in the foregoing, since the size-reduction operation section is capable of informing its open and closure states by an output from the switch 52, a size-reduction instruction signal can generated by opening the cover 39.

FIG. 5 shows other embodiment of the size-reduction operation section, in which a cover 66 is provided so as to close a recessed portion 70, in which buttons 40 are accommodated. Arms 67 and 68 integrally formed with cover 66 are held on a shaft 69 in a freely rotatable manner. When the cover 66 is opened, contact between the cover and a microswitch 71 is released, whereby, a contact a and a contact piece c (both not shown) accommodated in the microswitch 71 become mutually contacted. When the cover 66 is closed, an operating lever of the microswitch 71 is depressed to release the contact between the contact a and the contact piece c, and a contact b and the contact piece c (both not shown) become contacted.

As stated in the preceding, a size-reduction signal can be generated by bringing the cover to its open state even by the microswitch 71 in the size-reduction operation section.

With such construction of the size-reduction operation section, it becomes possible to instruct change-over between the one-to-one reproduction and size-reduced reproduction by opening and closing of the cover of the size-reduction operation section, i.e., at the time of the one-to-one reproduction operation, the size-reduction operation buttons 40-1 to 40-5 of the magnification change limiting means, which are not required to be manipulated, are shielded by the cover, whereby erroneous operation can be prevented, and desired copies can be made in exactly the same manner as in operating the conventional apparatus exclusive for the one-to-one reproduction, and, at the time of the size-reduced reproduction, the buttons are depressed for selecting the required size-reduction, whereby the opening operation of the cover is associated with selection of the size to be reproduced, i.e., one-to-one or size-reduction, hence the mechanism is easy to understand for the user as well as easy to operate.

Selection of a ratio of reduction at the time of size-reduction copying has heretofore been denoted mostly in terms of an area ratio of the reproduction copy with respect to the original image. The user, however, is only interested in the size of both the original image and the reproduction copy, and moreover the ratio of reduction is generally unfamiliar. Therefore, the apparatus according to the present invention is so designed that possible combinations between a size-reducible original image and a reproduction copy are incorporated therein, and the user of the apparatus may simply depress any desired one of the size-reduction operation buttons (switches 40-1 to 40-5) on the image recording member designating means. In other words, at the time of the magnification change reproduction, the image recording member designating means is used for designating the image recording member which conforms to the shape of the image after the magnification change, while, at the time of the one-to-one reproduction, only the cassette designating means is utilized. When any appropriate one of the operating buttons is depressed, an indicating lamp, to clearly show the depressed position, is lit in the button. Since depression of this size-reduction operation button is the requisite condition for determining a position of the lens, etc. which decides the reduction ratio, if none of the size-reduction operation buttons is pushed, the reproduction apparatus does not work with a view of not making erroneous copy, but the indicating lamps (for all size buttons), to show that the size-reduction operation button is pushed, are turned on and off (a blinking condition) to warn the operator against non-depression of any of the size-reduction operation buttons.

By designating the copy size through depression of the size-reduction operation button, the paper feeding cassette to be loaded in the reproduction apparatus must be conformed to the designated size. The relation between the direction of the original image for reproduction on the original mounting table and the feeding direction of the copying paper is fairly complicated in comparison with the reproduction apparatus exclusively for the one-to-one reproduction. The present device therefore is designed in the following manner so that the operator may be prevented from possible confusion. First of all, the original image is placed in exactly the same manner as in the case of the one-to-one reproduction. In this case, there occurs two situations, in which the image transfer sheet in the same size is forwarded in its lengthwise direction and in the breadthwise direction. The direction in which the paper should be forwarded is determined by the reproduction apparatus, and the accurate cassette is indicated to the operator. That is to say, of the two cassettes loaded in both upper and lower cassette mounts, if a cassette size selected by one of the upper and lower cassette selection buttons as indicated by the lamp is not the right one for making copy of the designated size, another lamp blinks to indicate the correct cassette, size to be replaced, and, at the same time, a warning lamp 75 indicating "USE WINKING CASSETTE SIZE" blinks on the abovementioned operating panel 30-1. During this period, the reproduction apparatus does not work at all, even if the copy buttons 32-1 or 33-1 are depressed. When the correct cassette is loaded by change-over of the upper and lower cassette selection button or replacement of the cassette, the blinking and warning by the lamp is discontinued and the copying operation starts. According to this embodiment, the blinking of the lamp is used as the warning indication. It is also effective to use any warning sound or change in color for each lamp so as to draw attention of the operator. Besides the above, when the reduced size and the paper size in the cassette are not conformed, it is permissible to depress the size-reduction operation button corresponding to the paper size as selected.

As stated in the foregoing, the reproduction apparatus according to the present invention does not necessitate the operator's judgement. Only if the adequate measures are taken in accordance with the instructions from the reproduction apparatus, correct copies as desired can be obtained. Thus, the conventional operating mechanism which has been complicated and hard to understand is now turned to one which is easy to understand and operate.

In the following, more detailed explanations of the reproduction apparatus according to the present invention will be given in reference to preferred, actual embodiments.

FIG. 6A shows a first embodiment of the circuit for a first embodiment of the reproduction apparatus according to the present invention. In the drawing SW1 corresponds to the size selection (one-to-one or size-reduction) switch 52 to be actuated by the abovementioned cover for determining the size of the reproduction copy (one-to-one or size-reduction). SW2 to SW6 are switches to be actuated by the size-reduction selection buttons 40-1 to 40-5 in FIG. 2B, wherein SW2 instructs size-reduction from A-3 to B-4, SW3 from A-3 to A-4, SW4 from B-4 to A-4, SW5 from B-4 to B-5, and SW6 from A-4 to B-5, respectively. SW7 is a switch to be actuated by the cassette selection buttons 36 and 37 in FIG. 2A, contacts 1 and 3 of which are connected by depression of the button 36, and contacts 3 and 2 of which are connected by depression of the button 37. SW8 and SW9 are switches that are actuated by a cam plate of the cassette (not shown). These switches serve for detecting whether the cassettes are loaded in the apparatus or not, and they are turned on when the cassettes are loaded therein. SW10 to SW16 are switches that are actuated by the cam plate of the cassette. They serve to detect the size of the cassette. The following Table 1 shows on-and-off states of the switches when various sizes of the cassettes are loaded in the apparatus.

TABLE 1

| | Switches | | | | cassette |
|---|---|---|---|---|---|
| | SW8 | SW10 | SW11 | SW12 | loaded in the upper level cassette |
| Size of cassette | SW9 | SW13 | SW14 | SW15 | loaded in the lower level |
| A-3(lengthwise) | ON | ON | ON | ON | |
| A-4(breadthwise) | ON | OFF | ON | ON | |
| B-4(lengthwise) | ON | ON | OFF | ON | |
| B-5(breadthwise) | ON | OFF | OFF | ON | |
| U-1(universal cassette) | ON | ON | ON | OFF | |
| U-2(universal cassette) | ON | OFF | ON | OFF | |
| A-4(lengthwise) | ON | ON | OFF | OFF | |
| B-5(lengthwise) | ON | OFF | OFF | OFF | |

In the above Table 1, the universal cassettes U-1 and U-2 are of a type that can feed various sizes of reproduction paper, the details of which appear in U.S. Pat. No. 4,032,136. The universal cassette U-1 is for large-sized paper, which can accommodate paper of the maximum size of 11 in.×17 in., while the universal cassette U-2 is for small-sized paper, which can accommodate therein the reproduction paper of the maximum of 8.5 in.×11 in.

In FIG. 6A, PL1 and PL2 are respectively lamps for indicating "one-to-one" and "size-reduction", PL3 to PL9 are lamps for indicating the size of the cassette, in which PL3 indicates the cassette for lengthwise feeding of A-3 size paper, PL4 indicates the cassette for breadthwise feeding of A-4 size paper, PL5 the cassette for lengthwise feeding of B-4 size paper, PL6 the cassette for breadthwise feeding of B-5 size paper, PL7 the universal cassette U-1 for large-sized paper, PL8 the universal cassette U-2 for small-sized paper, PL9 the cassette for lengthwise feeding of A-4 size paper, and PL10 the cassette for lengthwise feeding of B-5 size paper. Also, a lamp PL11 instructs replacement of the cassette, and a lamp PL12 notifies the operator to inspect the cassette.

T3 to T10 are respectively terminals for leading out a paper size signal into a control circuit CC. The control circuit CC is also applied with an input signal from a terminal T13 which produces an output signal to prohibit the reproduction operation, and another input signal showing which one of a plurality of magnification change modes (e.g. A-4 to B-5 change) it is limited, or that the one-to-one mode is selected. In this control circuit CC, there are carried out various controls corresponding to multitude of magnification change modes, i.e., one-to-one A-3, one-to-one B-4, one-to-one A-4, one-to-one B-5, A-3 to B-4 magnification change, A-3 to A-4 magnification change, and B-4 to B-5 magnification change. The control circuit CC produces a high tension transformer and main motor driving signal output from a terminal 01, a paper feeding solenoid signal output from a terminal 02, an optical system forwarding and exposure lamp signal output from a terminal 03, an optical system reversing signal output from a terminal 04, and a lens system driving signal output from a terminal 05, thereby controlling the reproduction apparatus with a timing and sequence corresponding to each mode. Since control of the reproduction apparatus with a sequence corresponding to a paper size signal has been well known, no detailed explanations will be given herein. (Reference should be had to U.S. Pat. No. 3,804,514 for details).

D1 to D10 denote diodes for preventing electric current from intrusion, LD1 to LD5 indicate light emitting diodes for indicating whether the size-reduction buttons are depressed, or not, R1 to R33 refer to resistors, C1 designates a capacitor, Tr1 to Tr13 are transistors, Ic1 to Ic6 are inverters, Ic7 refers to a voltage comparator (product of Mitsubishi Electric Co., Japan, Type M51201L) incorporating therein a Schmitt trigger circuit, the input and output of which are in the same phase, Ic8 to Ic11 denote AND gates, Ic12 to Ic14 are latches (e.g. SN7475 of Texas Instruments Inc., U.S.A.), Ic15 designates a NAND gate Ic16 refers to a decoder for converting a binary decimal code to a decimal code (e.g. SN7442 of Texas Instruments Inc., U.S.A.), Ic17 to Ic20 are inverters, Ic21 and Ic22 are NAND gates, Ic23 to Ic26 are AND gates, Ic27 is a NOR gate, Ic28 to Ic45 denote NAND gates, Ic46 refers to an inverter, and Ic47 designates a NAND gate.

Now, the operations of the circuit shown in FIG. 6A will be given hereinbelow wherein one-to-one copying operations will be described first. When the cover 39 of the size-reduction operation section is in a closed state, the contacts 1 and 3 of the switch SW1 are in a conductive state, hence the lamp PL1 is turned on to indicate that the reproduction operation is to be done in the one-to-one mode. Also, since the contacts 2 and 3 of the switch SW1 are open, an input at each input terminal 1 of the inverters Ic1 to Ic6 is at the level of logic "1" (hereinafter referred to as H), while an output at each output terminal 2 of the inverters Ic1 to Ic6 is at a level of logic "0" (hereinafter referred to as L). Since the inputs into the data input terminals D1 to D4 of the latch Ic12 and the data input terminals D1 and D2 of the latch Ic13 are all at the level L, the outputs from the output terminals $\overline{Q1}$ to $\overline{Q4}$ of the latch Ic12 and the output terminals $\overline{Q1}$ and $\overline{Q2}$ of the latch Ic13 are all at the level L. On the other hand, the outputs from the output terminals $\overline{Q1}$ to $\overline{Q4}$ of the latch Ic12 and the output terminals Q1 and Q2 of the latch Ic13 are all at the level H. Since input terminals 1 and 2 of the NAND gate Ic15 are connected to the output terminals Q3 and Q4 of the latch Ic12, the output from the output terminal 3 is at the level L, as the result of which the input at the input terminal 1 of the AND gate Ic23 is at the level L, and the output from the output terminal 3 of the AND gate Ic23 is also at the level L. Next, since the input at the input terminal 1 of the AND gate Ic24 is connected to the output terminal Q2 of the latch Ic12, the input takes the level L, hence the output from the output terminal 3 of the AND gate Ic24 also takes the level L. Further, since the input at the input terminal 1 of the AND gate Ic25 is connected to the output terminal Q2 of the latch Ic13, the input at the input terminal 1 of the AND gate Ic24 takes the level L, hence the output from the output terminal 3 of the AND gate Ic24 takes the level L. Furthermore, since the input at the input terminal 1 of the AND gate Ic26 is connected to the output terminal Q1 of the latch Ic13, the input into the AND gate Ic26 takes the level L, hence the output from the output terminal 3 thereof also takes the level L. Moreover, since the inputs at the input terminals 1 to 4 of the NOR gate Ic27 are respectively connected to the output terminals of the AND gates Ic23 to 26, all the inputs take the level L, while the output from the output terminal 5 takes the level H. Also, the input terminal 1 of the NAND gate Ic22 is connected to the output terminal Q1 of the latch Ic12, the input into the NAND gate Ic22 takes the level L, hence the output from the output terminal 7 thereof takes the level H. Next, since the input terminals 2 of the NAND gate Ic29 to Ic33 are respectively connected to the output terminals Q2 to Q4 of the latch Ic12 and the output Q1 and Q2 of the latch Ic13, the inputs of the NAND gates Ic29 to Ic33 are all at the level L, hence the outputs from the respective output terminals 3 are all at the level H. Now assume that, in this condition, an A-3 size cassette is loaded on the upper cassette mount, a B-4 size cassette is loaded on the lower cassette mount, and the upper-and-lower-cassette change-over switch SW7 is turned to the side of the upper cassette. In this case, the contacts 1 and 3 of the switch SW7 is in a conductive state. Since the upper cassette mount is loaded with the A-3 size cassette, the switches SW10 to SW12 are in the conductive states according to Table 1 shown in the foregoing. Accordingly, the inputs into the input terminals 1 of the AND gates Ic8 to Ic11 are all at the level H, and the outputs from the output terminals 3 of the AND gates Ic8 to Ic11 are all at the level L, hence the inputs into the input terminals D1 to D3 of the latch Ic14 are all at the level L, and the outputs from the output terminals Q1 to Q3 thereof are all at the level L. In this consequence, all the inputs at the input terminals A, B, C, and D of the decoder Ic16 take the level L, and the output of the output terminal 0 thereof is at the level L, while the outputs from the other output terminals 1 to 7 thereof are all at the level H. As the result, the input of the input terminal 2 of the NAND gate Ic36 connected to the output terminal 0 of the decoder Ic16 takes the level L, and the output from the output terminal 3 thereof drives the base of the transistor Tr4 which, in turn, actuates the lamp PL3 to indicate that the cassette is in the A-3 size. Incidentally, since the input terminals 1 and 2 of the NAND gate Ic21 are respectively connected to the output terminals 6 and 7 of the decoder Ic16, both inputs are at the level H and the outputs from the output terminals 3 thereof are at the level L. Accordingly, the inputs of the NAND gates Ic28 and Ic34 connected to the output terminal 3 of the NAND gate Ic21 also take the level L, and the output thereof takes the level H. From the above, since the inputs of the NAND gates Ic37 to Ic44 are all at the level H, the outputs from the NAND gates Ic37 to Ic44 are all at the level L, whereby the transistors Tr5 to Tr12 are in the off-state, and the lamps PL4 to PL11 are not turned on. Also, to the input terminal of the NAND gate Ic45, there is connected the output terminal 3 of the AND gate Ic11 through the inverter Ic46, hence its input is at the level H. Also, to the input terminal 2 of the NAND gate Ic45, there is applied a signal from other circuit (not shown), which is a paper detection signal to indicate the presence or absence of the image transfer paper within the cassette, through the terminal T2. Accordingly, if this paper detection signal is at the level H, which indicates that the paper is present in the cassette, the output from the NAND gate Ic45 takes the level L, whereby the transistor Tr13 is turned off and the lamp PL12 does not light. Conversely, if this paper detection signal is at the level L, the lamp PL12 is turned on to urge inspection of the cassette. In case the upper cassette mount is selected, wherein no cassette is present, or conversely, the lower cassette mount is selected, wherein no cassette is present, or neither cassette mount is selected, nor the cassette is present in either cassette mount, the output from the output terminal 3 of the AND gate Ic11 is at the level L, whereby the output from the inverter Ic46 takes the level L, the output from the NAND gate Ic45 takes the level H, and the transistor Tr13 is turned on to light up the lamp PL12 for inspection of the cassette. Thus, when the lamp PL12 is turned on, the level of the terminal T12 takes the level L, and the input at the input terminal 2 of the NAND gate Ic47 also takes the level L, hence the output from the output terminal 3 of the NAND gate Ic47 takes the level H, and a signal to prohibit reproduction operation is transmitted from the terminal T13 to the control circuit CC of the reproduction apparatus, whereby the reproduction operation is prohibited. In this way, the terminal T13 prohibits the reproduction operation in the same manner as does a jam detection signal. Next, when the cassette selection button 37 is depressed to set the lower cassette mount, by which the B-4 size cassette is selected, the contacts 2 and 3 of the switch SW7 become contacted, and the input at the input terminal A of the decoder Ic16 takes the level L, the input terminal B thereof takes the level H, the input terminal C thereof the level L, and the terminal D thereof the level L according to the abovementioned Table 1, as is the case with the abovementioned A-3 size cassette, whereby the output from the output terminal 2 of the decoder Ic16 takes the level L, while the other outputs are at the level H. In this consequence, the lamp PL5 is turned on to indicate that the cassette is in the B-4 size. In the same manner, by inserting the other size of the cassette into the inserting port of the cassette mount and selecting a desired cassette through depression of the button 36 or 37, there will be indicated the desired size of the cassette as selected. In this state, when the abovementioned copy button 32 or 33 is depressed, the image transfer paper is fed out of the designated cassette, and the reproduction of the original image is carried out in the sequence of feeding of the image transfer paper. Now assume that the cassette in A-4(R) size for the size-reduction reproduction is inserted into the inserting port of the cassette mount (R) denotes the lengthwise forwarding of the paper), and this cassette is selected by the button 36 or 37. As in the abovementioned case, the input at the input terminal A of the decoder Ic16 is at the level L in accordance with Table 1 above, the input of the input terminal B is at the level H, the input of the input terminal C is at the level H, and the input of the input terminal D is at the level L, whereby the output from the output terminal 6 of the decoder Ic16 takes the level L and the outputs from the other output terminals are all at the level H. In this consequence, the lamp PL9 is turned on. At the same time, since the output from the output terminal 6 of the decoder Ic16 is at the level L, the input at the input terminal 1 of the NAND gate Ic21 also takes the level L, whereby the output from the NAND gate Ic21 is at the level H, and the input at the input terminal 2 of the NAND gate Ic28 is also at the level H. Further, since the input at the input terminal 1 of the NAND gate Ic28 is connected to the collector of the transistor Tr1, the transistor Tr1 constitutes an oscillating circuit with the Schmitt trigger Ic7, the resistor 6, and the capacitor C1, and the output from the transistor Tr1 continuously repeats its on-off operations at a certain definite cycle, the input at the input terminal 1 of the NAND gate Ic28 alternately changes its level between H and L, whereby the output from the output terminal 4 thereof also repeats the alternate changes in the level between H and L. As the result, the inputs at the input terminals 1 of the NAND gates Ic36 to Ic41 repeat the alternate level changing between H and L, whereby the lamps PL3 and PL8 turn on and off. In addition, since the output from the NAND gate Ic21 is at the level H, the input at the input terminal 1 of the NAND gate Ic34 is also at the level H, whereby the output from the NAND gate Ic34 is at the level L and the input at the input terminal 1 of the NAND gate Ic44 is also at the level L. Thus, the transistor Tr12 is actuated and the lamp PL11 is lit. In this way, when the A-4 cassette in the lengthwise forwarding A-4(R) is set and so selected for the one-to-one copying, the lamp PL9 to indicate the presence of the A-4(R) cassette is lit to indicate selection of the A-4(R). At the same time, the lamps PL3 to PL8 to indicate the cassettes for the one-to-one copying are turned on and off, and the lamp PL11 to instruct replacement of the cassette is turned on to warn and instruct the operator for the subsequent operations. In the same manner, when a cassette B-5(R) is set and so selected, the lamp PL10 is lit, and the lamps PL3 to PL8 are turned on and off, while the lamp PL11 is turned on to warn and instruct the operator to take the subsequent operations. When the lamp PL11 is turned on, the level of the terminal T11 is at L, and the input at the input terminal 1 of the NAND gate Ic47 takes the level L, whereby the output from the output terminal 3 thereof is at the level H, and a signal to prohibit the reproduction operation is transmitted from the terminal T13 to the control circuit CC of the reproduction apparatus to prohibit the reproduction operation.

In the following the operations for the size-reduction copying will be explained. The operator of the reproduction apparatus, when he wants to make a size-reduction reproduction, first opens the cover as shown in FIG. 2B. By opening the cover, the switch 52 (SW1) is changed over to bring the contacts 2 and 3 of the switch SW1 into mutual contact, whereby the lamp PL2 is turned on to indicate that the apparatus is in the size-reduction copying mode. Now assume that, under such situation, the size-reduction selection button (from A-3 to A-4 size) is depressed, and the A-3 size cassette is selected by the button 36 or 37. In this case, the switch SW3-1 becomes conductive to cause electric current to flow through the light emitting diode LD2, whereby the diode emits light to indicate that the size-reduction from A-3 to A-4 size has been instructed. Simultaneously, as the contacts 2 and 3 of the switch SW1 and the switch SW3-1 become also conductive, the inputs at the input terminals 1 of the inverters IC1 and IC3 take the level L, and the outputs from the output terminals 2 of the respective inverters take the level H. At this time, the inputs of the inverters IC2, IC4, IC5, and IC6 are all at the level H, because the switches SW2-1, SW4-1, SW5-1, and SW6-1 are open. Accordingly, the inputs at the input terminals D1, D2, D3, and D4 of the latch IC12 respectively take the levels H, L, H, and L, the inputs at the input terminals D1 and D2 of the latch IC13 respectively take the levels L and L, the outputs from the output terminals (Q1, $\overline{Q1}$), (Q2, $\overline{Q2}$), (Q3, $\overline{Q3}$), and (Q4, $\overline{Q4}$) respectively take the levels (H, L), (L, H), (H, L), and (L, H), and the outputs from the output terminals (Q1, $\overline{Q1}$) and (Q2, $\overline{Q2}$) of the latch IC13 respectively take the levels (L, H) and (L, H). Also, since the A-3 size cassette is selected, the output from the output terminal O of the decoder IC16 is at the level L, while the outputs from the other output terminals 1 to 7 thereof are at the level H.

As mentioned above, since the input terminals 1 and 2 of the NAND gate IC15 are respectively connected to the output terminals $\overline{Q3}$ and $\overline{Q4}$ of the NAND gate IC12, and the outputs from them are all at the level H, the output from the output terminal 3 of the NAND gate IC15 is at the level L, whereby the input at the input terminal 1 of the AND gate IC23 is also at the level L, and the output from the output terminal 3 thereof is also at the level L. Although the input terminal 2 of the AND gate IC24 is connected to the output terminal 2 of the decoder IC16 through the inverter IC18, as the output from the output terminal 2 of the decoder IC16 is at the level H, the input at the input terminal 2 of the AND gate IC24 takes the level L and the output from the output terminal 3 thereof also takes the level L. Since the input at the input terminal 1 of the AND gate IC25 is connected to the output Q2 of the latch IC13, its level is at L, and the output of this gate is also at the level L. Also, as the input terminal 1 of the AND gate IC26 is connected to the output Q1 of the latch IC13, its input is at the level L, and the output thereof is also at the level L. Accordingly, the inputs at the input terminals 1 to 4 of the NOR gate IC27 with the outputs from the AND gates IC23 to IC26 as the inputs thereto are all at the level L, and the output from the output terminal 5 of this NOR gate IC27 is at the level H. The input at the input terminal 3 of the NAND gate IC22 is connected to the output terminal $\overline{Q3}$ of the latch IC12, hence its level is L, and the output from the output terminal 7 of the gate is at the level H. The input terminal 1 of the NAND gate IC35 is connected to the output terminal 7 of the NAND gate IC22, the input terminal 2 thereof is connected to the output terminal 5 of the NOR gate IC27, and the input terminal 3 thereof to the output terminal Q1 of the latch IC12, the input levels of which are all at H, hence the output from the output terminal 4 of this NAND gate IC35 is at the level L. Further, as the output terminal 4 of this NAND gate IC35 is connected to the input terminal 2 of the NAND gate IC44, the output from this gate IC44 causes electric current to flow into the base of the transistor Tr12 to turn it on, whereby the lamp PL11 is lit. Since input terminal 1 of the NAND gate IC21 is connected to the output terminals 6 and 7 of the decoder IC16, the output from the output terminal 3 thereof is at the level L, hence the input at the input terminal 2 of the NAND gate IC28 is also at the level L, and the output from the output terminal 4 thereof is at the level H. Moreover, since the input terminal 2 of the NAND gate IC30 is connected to the output terminal Q3 of the latch IC12, its input is at the level H, while the input at the input terminal 1 thereof is connected to the collector of the transistor Tr1 which produces outputs at the levels H and L alternatively, the output from the output terminal 3 of the NAND gate IC30 also repeats the levels H and L alternately. Furthermore, since the input at the input terminal 2 of the NAND gate IC42 is connected to the output terminal 3 of the NAND gate IC31, and the input terminal 3 thereof is connected to the output terminal 6 of the decoder IC16, the inputs at both input terminals 3 and 2 of the NAND gate IC42 are all at the level H, and, since the input terminal 1 thereof is connected to the output terminal 3 of the NAND gate IC30, the input at this terminal alternately repeats the level H and L, whereby the output from the output terminal 4 of the NAND gate IC42 causes electric current to flow intermittently into the base of the transistor Tr10 to turn on and off the lamp PL9. As stated in the foregoing, since the A-3 size cassette has been selected, the output from the output terminal O of the decoder IC16 is at the level L, and the input at the input terminal 2 of the NAND gate IC36 is also at the level L, hence the output from the output terminal 3 of the NAND gate IC36 causes electric current to flow into the base of the transistor Tr4 to turn it on, and the lamp PL3 is lit.

From the above-described operations, it will be clearly understood that, if an inadequate A-3 size cassette has been selected in spite of the size-reduction copying from A-3 to A-4 size having been selected, the lamp PL3 to indicate the A-3 size is lit, manifesting that the A-3 size cassette has been selected at present. At the same time, the lamp PL9 to indicate the A-4(R) cassette to be selected is turned on and off, and the lamp PL11 to instruct replacement of the cassette is further lit to warn the operator to replace the cassette with that in A-4(R) size. As soon as the cassette is changed to the A-4(R) size, the output from the output terminal 6 of the decoder IC16 takes the level L, and the other outputs are all at the level H, whereby the lamp PL9 is turned on and the lamps PL3 and PL11 do not light up. In the same manner, when the size-reduction in other different size has been selected, and an adequate cassette is selected, the cassette size alone is indicated on the lamp; however, if an inadequate cassette is selected, the cassette size as selected is indicated along with the adequate cassette size being indicated by turning on and off of the revelent lamp, and the lamp PL11 to instruct the cassette replacement is lit to warn the operator to that effect, and the reproduction operation is simultaneously prohibited.

In the following, explanations will be given as to a case, wherein the cover 39 for changeover between one-to-one reproduction and size-reduction reproduction is open, and no size-reduction selection button (40-1 to 40-5) is depressed. In this case, since none of the size-reduction selection buttons is depressed, the switches SW2-1, SW3-1, SW4-1, SW5-1, and SW6-1 are all open, and the switches SW2-2, SW3-2, SW4-2, SW5-2, and SW6-2 are all closed. (It is to be noted that the switches having a sub-number −1 and the switches having a sub-number −2 are mutually associated in their on-and-off state being just opposite.) Also, since the cover is open, the contacts 2 and 3 of the switch SW1 are conductive, hence the input at the input terminal 1 of the inverter IC1 is at the level L and the output from the output terminal Q1 thereof is also at the level L. In this consequence, the transistor Tr2, the base of which is connected to the output terminal $\overline{Q1}$ of the latch IC12 through the resistor R14, becomes "off", and electric current flows alternately in the base of the transistor Tr3 from the resistor R8 connected to the collector of the transistor Tr1 through the resistor R15, whereby the transistor Tr3 repeats the on-and-off operations. Accordingly, electric current flows alternately in the light emitting diodes LD1 to LD5 through the resistors R1 to R5, the diodes D6 and D10, the switches SW2-2, SW3-2, SW4-2, SW5-2, and SW6-2, and the collector of the transistor Tr3, whereby the light emitting diodes LD1 to LD5 are turned on and off to warn the operator against non-depression of the size-reduction selection buttons. When the cover 39 is closed, the output from the output terminal $\overline{Q1}$ of the latch IC12 is at the level H, hence the transistor Tr2 is "on", and the transistor Tr3 is "off", whereby the light emitting diodes LD1 to LD5 are extinguished, even if the size-reduction selection button is not depressed. In the foregoing explanations, it is described that the latches IC12 to IC14 send out all the data input D thereinto as the outputs therefrom. However, these latches are so constructed that these data inputs D may be latched as they are, since, during execution of the copying operation by the reproduction apparatus, the outputs Q and $\overline{Q}$ do not change even when the data inputs D vary. Since this is not directly related to the present invention, no further detailed explanation will be given herein. To sum up, these latches are for preventing various inconveniences from taking place by the changes in the positions of the optical lens, optical mirror, etc. and the exposure area of the original image during the reproduction operation, since they are all controlled by a size-reduction signal and a cassette size signal.

FIG. 6B shows a cover closing circuit to be used when the power source is turned off, or when no copying operation is started after lapse of a certain definite time with the cover being opened, or when no subsequent copying operation is started after lapse of a certain definite time upon completion of reproduction of predetermined numbers of the copy sheets with the cover being opened. The operation of this cover closing circuit is such that, when the abovementioned cover is opened, the contacts 2 and 3 of the switch SW1 become conductive, and the input of the inverter Ic101 takes the level L, and the output thereof takes the level H. (It should be understood that the terminal T101 is connected to the contact 2 of the switch SW1 in the circuit shown in FIG. 6A.) Then, the transistor Tr101 is turned on and the capacitor C102 discharges, whereby ⊖ terminal of the operational amplifier OP101 takes the level L and the output thereof takes the level H. As the result, the transistor Tr102 is turned on through the resistor R108 and the zener diode ZD101 to energize an electromagnet 61′, whereby the cover is maintained in its open state. In this state, however, if the copying operation is not started, the transistor Tr101 is turned off after lapse of a predetermined time by a time constant circuit composed of the resistor R101 and the capacitor C101. Subsequently, when the capacitor C102 is charged via resistor R105 the ⊖ input terminal of the operational amplifier OP101 takes a level higher than that of the ⊕ input terminal of operational amplifier OP101, and the output thereof takes the level L. As the result, the transistor Tr102 is turned off, the electromagnet 61′ is deenergized to render the cover in its closed state, the contacts 1 and 3 of the switch SW1 become conductive, and the one-to-one copying mode control means is selected.

Upon opening of the cover, when the copying operation is started, the base input of the transistor Tr101 takes the level H and the transistor Tr101 is turned on, because a high tension transformer and main motor signal has been provided at the abovementioned terminal 01. In this consequence, the transistor Tr102 is also turned on and the electromagnet 61′ is energized, whereby the cover is maintained in its open state. When copying of predetermined numbers of sheets has been accomplished, the abovementioned high tension transformer and main motor signal takes the level L, whereby the transistor Tr101 is turned off and the capacitor C102 begins to be charged through the resistor R105 with the consequence that the ⊖ input terminal of the operational amplifier OP101 takes a level higher than that of the ⊕ input terminal thereof, and the output thereof takes the level L. Thus, the transistor Tr102 becomes "off", and the electromagnet 61′ is de-energized to bring the cover to its closed state, the contacts 1 and 3 of the switch SW1 become conductive, and the one-to-one copying mode control means is thereby selected. Also, in case the power source is turned off, the electromagnet 61′ is naturally de-energized, and the cover is brought to its closed state.

Figure 6C:
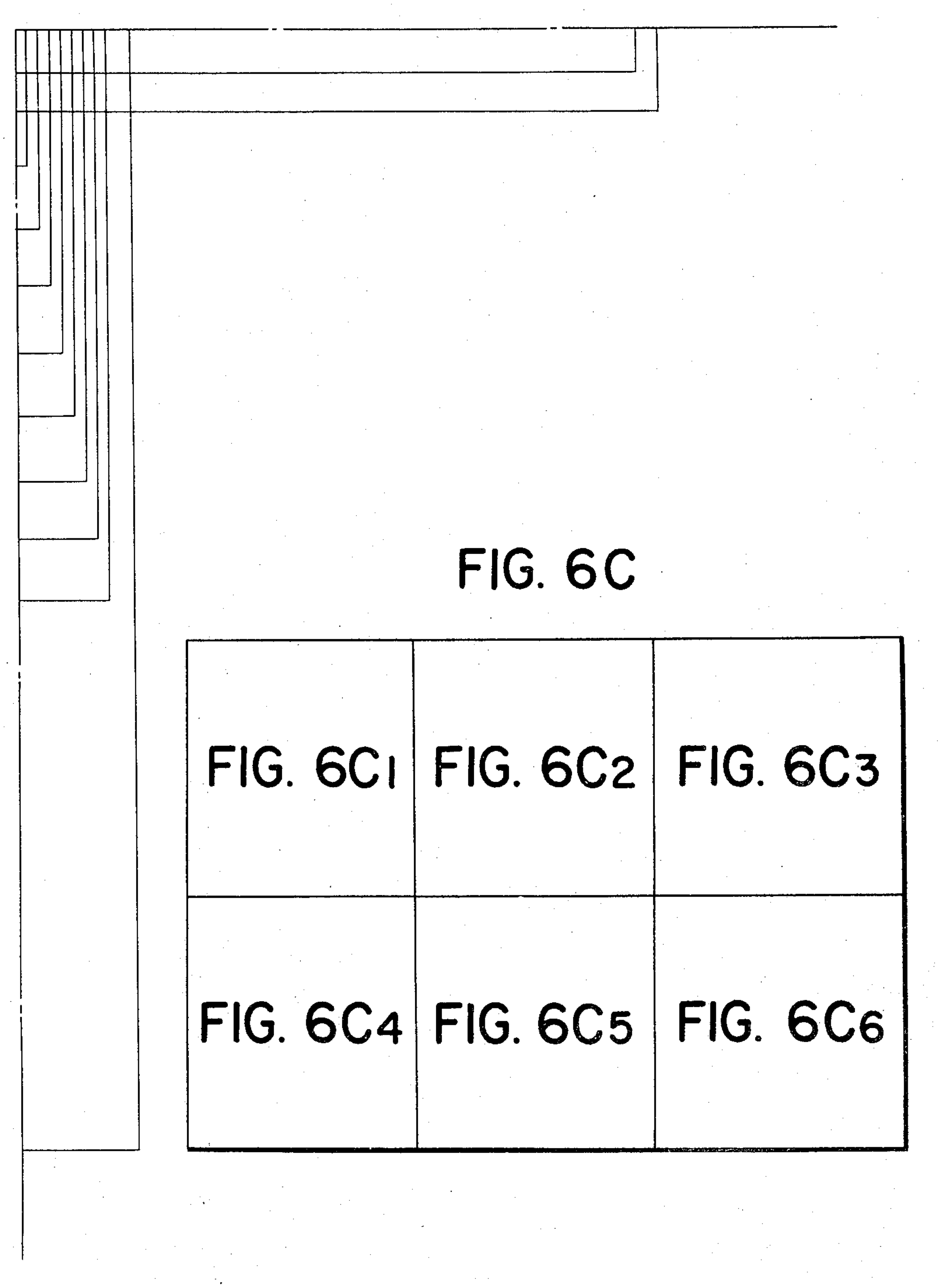
FIG. 6C is a second embodiment of the circuit diagram for the first reproduction apparatus.

FIG. 6C shows the second embodiment of the circuit for the first reproduction apparatus. The circuit in FIG. 6C is so constructed that, when any one of the size-reduction operation buttons is depressed, designating a desired size-reduction reproduction, if the image recording member corresponding to the designated size-reduction mode is present as the result of searching both upper and lower cassette mounts within the reproduction apparatus for such appropriate image recording member, the recording member as detected is fed into the reproduction apparatus from its detected position.

In the circuit of FIG. 6C, those parts designated by the same reference numerals and symbols as in FIG. 6A are understood to have the same functions as those in FIG. 6A. In this circuit construction, Ic14*a* refers to a latch having the same function as the latch Ic14 in FIG. 6A, but detects only the upper cassette size. Similarly, Ic14*b* is a latch to detect the lower cassette size alone. Ic16*a* designates a decoder having the same function as the decoder Ic16 in FIG. 6A, but produces an output signal for the upper cassette size alone. Similarly, Ic16*b* refers to a decoder to produce an output signal for the lower cassette size alone. Ic201 denotes an AND gate, Ic202 to Ic227 are inhibiting AND gates, Ic229 to Ic232 are OR gates, and Ic233 to Ic245 are NOR gates.

The operations of the circuit in this FIG. 6C will now be explained hereinbelow. When the one-to-one recording is designated, the cover is closed and the selection of the image recording member by the image recording member designating means is prohibited, and selection of the upper and lower cassette is performed. When the upper cassette is selected, the contacts 1 and 3 of the switch SW7′ become conductive, and a cassette size signal from the decoder Ic16*a* is selected, whereby any one of the lamps PL3 to PL10 is turned on to indicate the presence of the designated cassette. In this case, if the cassette of A-4 (lengthwise forwarding) or B-5 (lengthwise forwarding) is accommodated in the upper cassette mount, the lamps PL3 to PL8 are all turned on and off, and the lamp PL11 is turned on to instruct replacement of the cassette for any one, for which the lamps are turned on and off. Simultaneously with this, the copying operation is prohibited by the control circuit CC. If, for example, the cassette of A-4 size (breadthwise forwarding) is loaded on the upper cassette mount and the copying operation is carried out in this state, an upper cassette selection signal output is produced from the output terminal 06 and the copying operation is performed. Control of the reproduction apparatus is as mentioned above. The same holds good when the lower cassette is selected.

The following explanations are for a case, wherein the size-reduction reproduction is selected. When the size-reduction from A-3 to B-4 size is selected out of the image recording member designating means, the switch SW2-1 becomes conductive, and the output from the output terminal Q2 of the latch Ic12 takes the level H. If the B-4 size cassette is loaded either in the upper cassette mount or in the lower cassette mount, the lamp PL4 which indicates the B-4 size is turned on. When the B-4 size cassette is loaded in the lower cassette mount, a lower cassette signal output is produced from the OR gate Ic232 and transmitted to the control circuit CC. If the B-4 size cassette is loaded neither in the upper cassette mount, nor in the lower cassette mount, the lamp PL5 is turned on and off, and the lamp PL11 is turned on to instruct the operator to load the B-4 size cassette in either the upper or the lower cassette mount, while prohibiting the copying operation. When the size-reduction has been selected, selection of the upper and lower cassette by the switch SW7′ is inhibited. When the cassette is loaded in neither the upper cassette mount, nor the lower cassette mount, the lamp PL12 is turned on to urge inspection of the cassette, and prohibit the copying operation. The same holds good when no image transfer paper is in the cassette in the upper and lower cassette.

As stated above, when the desired size of the cassette is found to be loaded in any one of the upper and lower cassette mounts as the result of searching for such desired cassette in both upper and lower cassette mounts at the time of the size-reduction designation by the use of the circuit shown in FIG. 6C, the copying operation can be performed straightforwardly, and the operator need not inspect the cassette size in the upper and lower cassette mounts. In this embodiment, two cassette mounts are seen to be provided in the reproduction apparatus, although the number can be increased as desired, whereby simpler selection of the cassette becomes feasible. In the present embodiment, also, the upper and lower cassettes are searched only at the time of the size-reduction designation. However, when the image size is designated at the time of the one-to-one recording, and the output signal thereof or a size of the original image is automatically detected, the image recording member in the cassette loaded on the adequate cassette mount can be selected by coinciding the detected signal with the cassette size signal in the upper or lower cassette mounts.

The foregoing explanations have been made with respect to a case, wherein the operator designates the shape of the recording image by the operating buttons. Now, the present invention will be described with reference to the second embodiment of the image recording apparatus, wherein the shape of the image is automatically detected and notified to the operator together with the shape of the image transfer paper as the image recording member, and the shape of the original image is positively notified to the operator, if the shape of the abovementioned original image does not coincide with the shape of the abovementioned image transfer paper.

Figure 7:
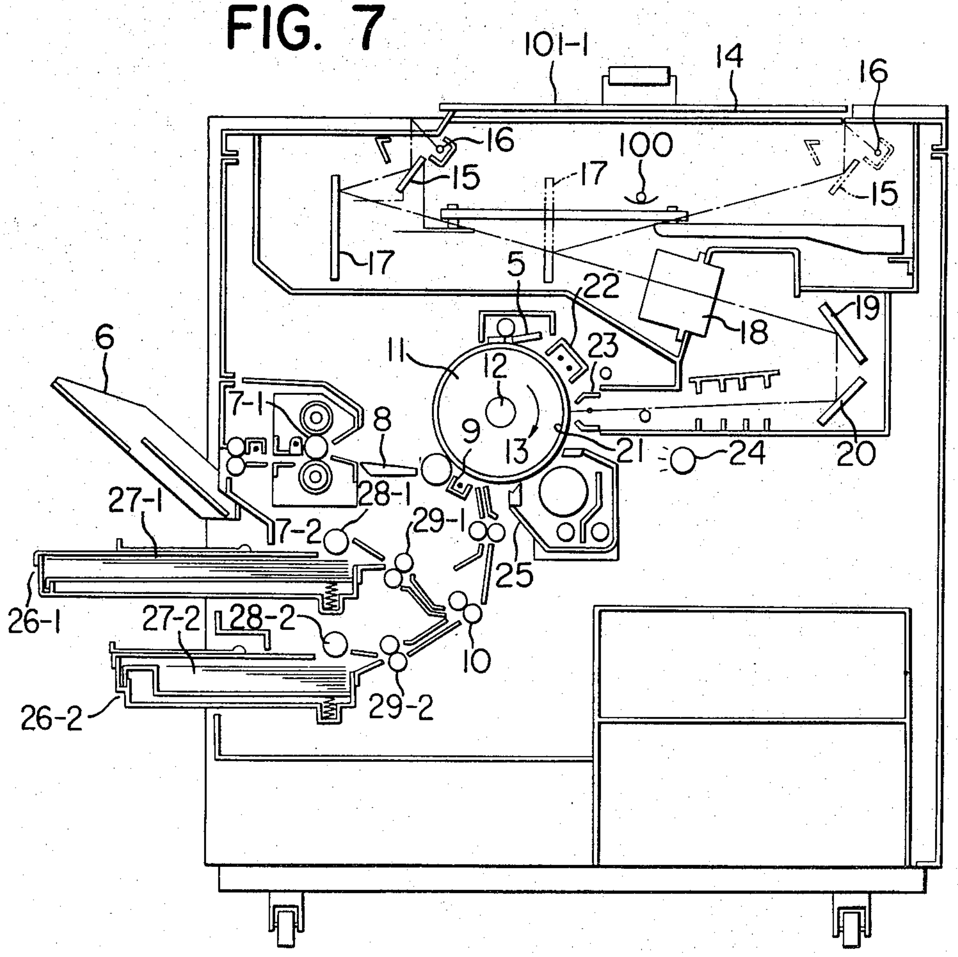
FIG. 7 is a side elevational view in cross-section showing a second embodiment of the reproduction apparatus, to which the present invention is applied.
Figure 8:
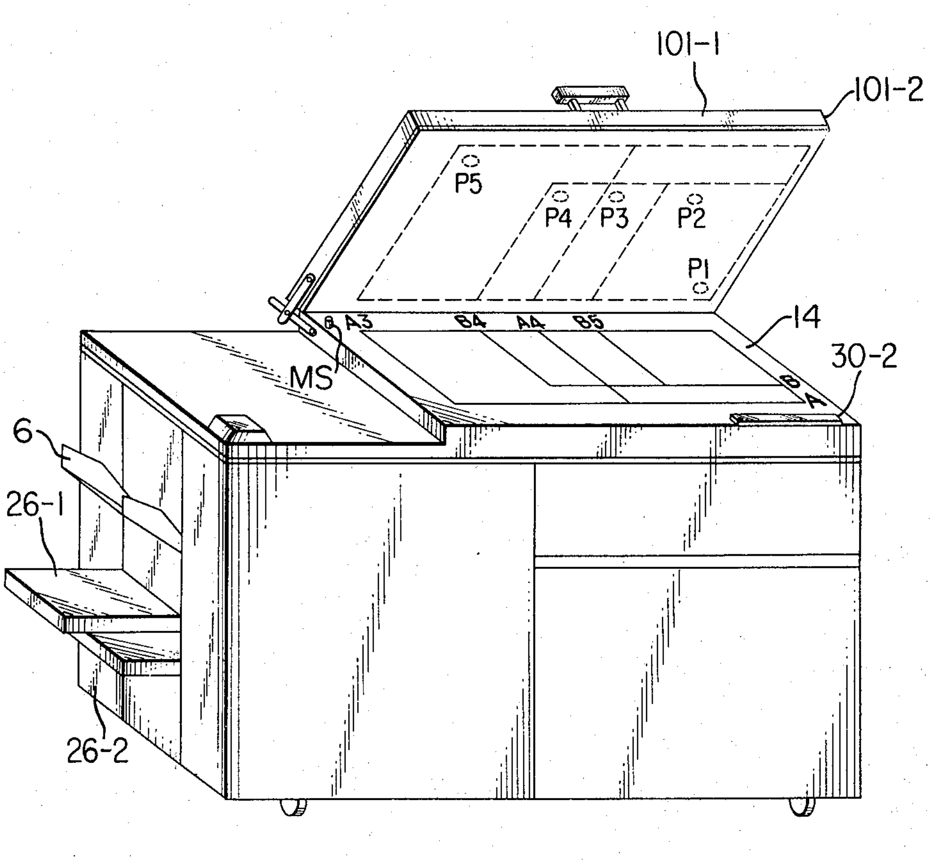
FIG. 8 is a perspective view of the second reproduction apparatus shown in FIG. 7.

FIG. 7 illustrates a cross-sectional view of the second embodiment of the electrostatic reproduction apparatus according to the present invention, and FIG. 8 illustrates a perspective view of the reproduction apparatus shown in FIG. 7. It should be understood that, in FIGS. 7 and 8, those parts designated by the same reference numerals and symbols as those in FIG. 1A have the same functions, and are controlled in the same sequence.

In FIGS. 7 and 8, 100 refers to an infrared ray lamp which is opposed to light receiving elements P1, P2, P3, P4, and P5 fitted on an original fixing plate 101-1 facing the size of an original mounting glass 14. The infrared ray lamp detects a size of the original image on the original mounting glass 14. The light receiving elements P1 to P5 possess the photoconductive property even in the infrared region. As shown in FIG. 7, when the original fixing plate 101-1 is lowered down to cover the original mounting glass 14, if the infrared ray is not, or is least, irradiated onto the light receiving elements P1 and P2, and it is irradiated onto the other light receiving elements P3 to P5, an original in B-5 size is placed on the original mounting glass 14 in the right position. Also, if the infrared ray is not, or is least, irradiated onto the light receiving elements P1, P2, and P3, and it is irradiated onto the light receiving elements P4 and P5, an original in A-4 size is placed on the original mounting glass 14 in the right position. Further, if the infrared ray is not, or is least, irradiated onto the light receiving elements P1 to P4, and it is irradiated onto the light receiving element P5, an original in B-4 size is placed on the original mounting glass 14 in the right position. Furthermore, if the infrared ray is not, or is least, irradiated onto the light receiving elements P1 to P5, an original in A-3 size is placed on the original mounting glass 14 in the right position. Moreover, if the infrared ray is sufficiently irradiated onto the light receiving element P1, and it is not, or is least, irradiated onto at least one of the remaining light receiving elements, this indicates that the original image is not placed correctly on the original mounting glass 14.

In the following, the first electrical circuit for the second embodiment of the reproduction apparatus will be described in reference to FIG. 9. The light receiving elements P1 to P5 are respectively connected to circuits CT1 to CT5, each being composed of resistors R51 to R55 and an operational amplifier OP. When light is irradiated onto the light receiving elements P1 to P5, and the resistance values thereof become lower than a certain level, a voltage output at the level L is produced from an output terminal 6 of the operational amplifier OP. Also, when light is not irradiated, or is irradiated in a very small amount, a voltage output at the level H is produced from the output terminal 6. A signal from the output terminal 6 is introduced as an input into a logical circuit composed of inverters Ic51 to Ic61, AND gates Ic62 to Ic67, and OR gates Ic68 to Ic72. Each of the AND gates Ic62 to Ic66 is applied with a pulse signal PS from the oscillator OSC through the AND gate Ic67. The pulse signal PS has a frequency range of from 0.5 to 1 Hz. The OR gates Ic69 to Ic72 are applied with respective cassette size signals as selected. That is, the OR gate Ic69 is applied with a cassette size signal CSB5 in the B-5 size, the OR gate Ic70 is applied with a cassette size signal CSA4 in the A-4 size, the OR gate Ic71 is applied with a cassette size signal CSB4 in B-4 size, and the OR gate Ic72 is applied with a cassette size signal CSA3 in A-3 size. Accordingly, the selected cassette size signal turns on the lamps LB5, LA4, LB4, and LA3 irrespective of the output signals from the AND gates Ic62 to Ic65. In other words, when a cassette accommodating therein B-5 size paper is selected, the OR gate Ic69 produces a voltage output at the level H irrespective of the output from the AND gate Ic62, whereby an output from the inverter 5 takes the level L and the lamp LB5 is turned on. In the same manner, when the A-4 size cassette is selected, the lamp LA4 is turned on. When the B-4 size cassette is selected, the lamp LB4 is turned on, and when the A-3 size cassette is selected, the lamp LA3 is turned on.

When the B-5 size original is placed on the original mounting glass 14 in the right position, the output signals from the circuits CT1 and CT2 are at the level H, while the AND gate Ic62 alone out of the AND gates produces an output signal therefrom at the levels H and L alternately, and introduces it into the OR gate Ic69 based on its relationship with the pulse signal PS. The remaining AND gates constantly show the level O. Accordingly, when the cassette size signal CSB5 is produced, the lamp LB5 is always lit. However, when the other cassette size is selected, the lamp LB5 is turned on and off to positively notify the operator that the original is in B-5 size. The operation is the same even when the original in A-4, B-4, or A-3 size is placed on the original mounting glass 14 in the right position. Further, when the original is not placed in the right position and sufficient light is irradiated onto the light receiving element P1, while the light is not sufficiently irradiated onto at least one of the remaining light receiving elements, the output from the AND gate Ic66 alternately repeats the level H and L based on its relationship with the pulse signal PS, thereby turning on and off the warning lamp LAT.

The lamps LB5, LA4, LB4, LA3, and LAT are provided on an operating panel 30-2 shown in FIG. 8. This operating panel 30-2 is shown in an enlarged scale in FIG. 10. In FIG. 10, 36-2 designates a selection button to select the upper cassette 26-1, 37-2 refers to a selection button to select the lower cassette 26-2, 35-2 denotes an image density adjusting knob, 31-2 is a reproduction number setting dial, the set number of the reproduction sheet being indicated on a segment indicator 102. 32-2 denotes a continuous reproduction start button, and 33-2 is a single reproduction start button. 38-2 refers to a cassette indicator board. When the abovementioned selection button 36-2 or 37-2 is depressed, a signal indicating that the cassette is loaded in the reproduction apparatus appears on the cassette indicator board. For example, in case the B-5 size cassette is loaded on the upper cassette mount, if the upper cassette selection button 36-2 is depressed, the lamp LB2 is turned on to inform the operator of the cassette size. In the state, wherein the original fixing plate 101-1 is not lowered down, the microswitch MS shown in FIG. 9 is not depressed, hence an input signal at the level H is applied to the input terminal of the inverters Ic60 and Ic61, whereupon the outputs from these inverters takes the level L. In this consequence, the output from the AND gate Ic67 takes the level L and the outputs from the AND gates Ic62 to Ic66 are all at the level L with the consequence that no output is produced. Further, since the output from the inverter Ic61 is at the level L, electric current flows through a relay K, and the contact K-1b is opened. Accordingly, the infrared ray lamp 100 is not lit.

Figure 9:
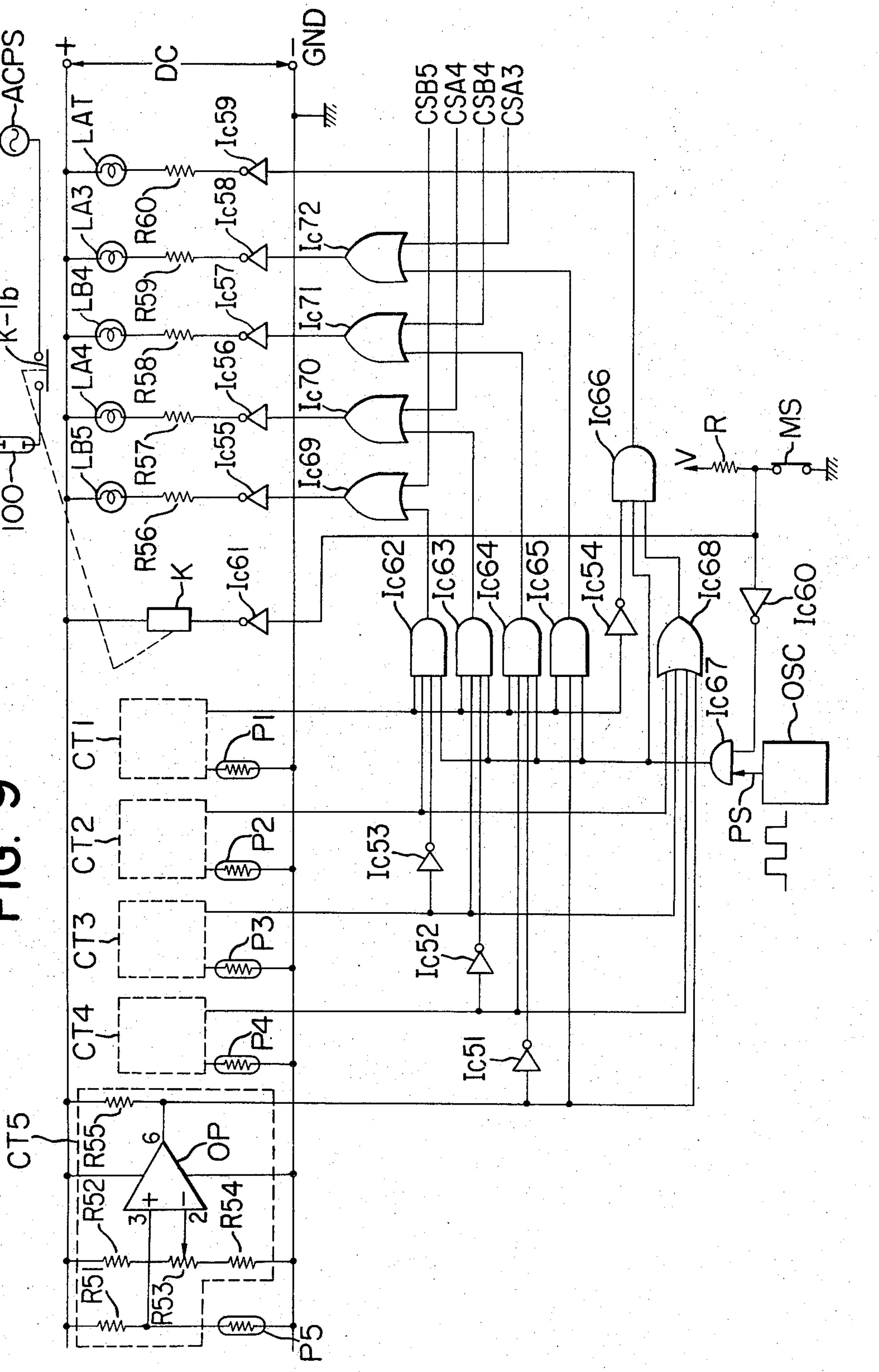
FIG. 9 is a first embodiment of the circuit diagram for the second reproduction apparatus.
Figure 10:
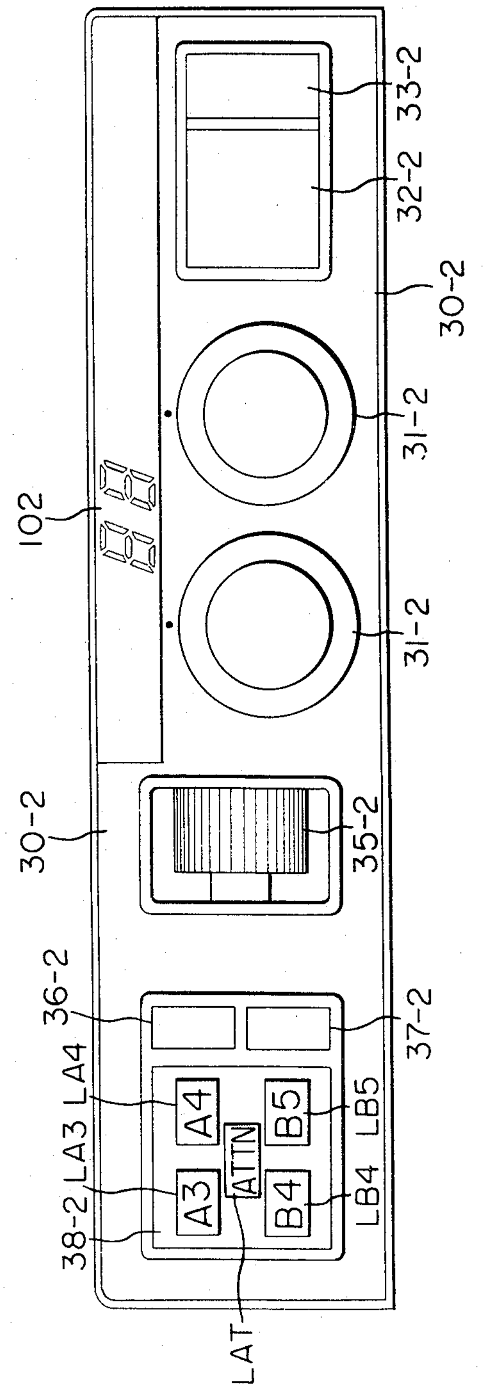
FIG. 10 is a top plan view of the operating panel of the second reproduction apparatus.

When the original image to be reproduced is placed on the original mounting glass and the original fixing plate 101-1 is lowered down, the microswitch MS of FIG. 9 is depressed, and the inputs at the input terminals of the inverters Ic60 and Ic61 take the level L. In this state, since no electric current flows through the relay K, the contact K-1b thereof is closed, and the current is supplied from an alternating current power source ACPS to the infrared ray lamp 100 to turn it on. At the same time, the pulse signal output PS is produced from the AND gate Ic67 and sent into the AND gates Ic62 to Ic66 as the input thereto. It should be noted that, when the abovementioned photosensitive drum 11 does not have the photosensitive characteristic with respect to the infrared region, no influence is given to the image by the infrared ray during the copying operation, even when the infrared ray lamp 100 is lit. Therefore, the lamp 100 may be of any kind that emits to the photosensitive drum 11 a light in a frequency having no photosensitive property. When the B-5 size cassette is selected and the original in A-4 size is placed on the original mounting glass 14, the lamp LA4 is turned on and off to positively notify the operator to the effect that the original is in the A-4 size. Upon this information, the operator who desired the recording to be effected in the A-4 size, but did not expect it to be carried out in the B-5 size, can immediately select the A-4 size cassette. However, depending on the situation, as it is usually conceivable that the A-4 size original image can be reproduced on the B-5 size recording material, the copying operation can also be started by depression of the copy start button 32-2 or 33-2, while the lamp LA4 is being turned on and off. Furthermore, when the original is not placed in the correct position, or when the original is in a very special shape, if sufficient light is irradiated onto the light receiving element P1, and the light is not irradiated sufficiently on at least one of the remaining light receiving elements, the lamp LAT, which warns the operator by means of the inverters Ic54 and Ic59, the AND gate Ic66, the OR gate Ic68, and the abovementioned pulse signal PS, is turned on and off. When the operator notices that the original was placed in the wrong position, he can reinstate it at the right position. When the operator expected from the shape of the original image that the lamp LAT would be turned on and off as a matter of course, he can depress the copy start button 32-2 or 33-2 with the lamp LAT being turned on and off. Incidentally, when the shape of the original is special, or when a small-sized original is reproduced on a large-sized image transfer paper, there would occur such a situation that the light receiving elements P1 to P5 on the original fixing plate 101-1 are recorded on the image transfer paper. This problem can be solved by embedding these light receiving elements P1 to P5 within the original fixing plate 101-1, and by fitting an infrared ray transmitting and visible light reflecting filter 101-2 over these light receiving elements. For the filter 101-2, glass which is multi-coated with ZnS, $MgF_2$, and so on may be used, although a gelatin film doped therein with a pigment is preferable in view of its flexibility.

Figure 11A:
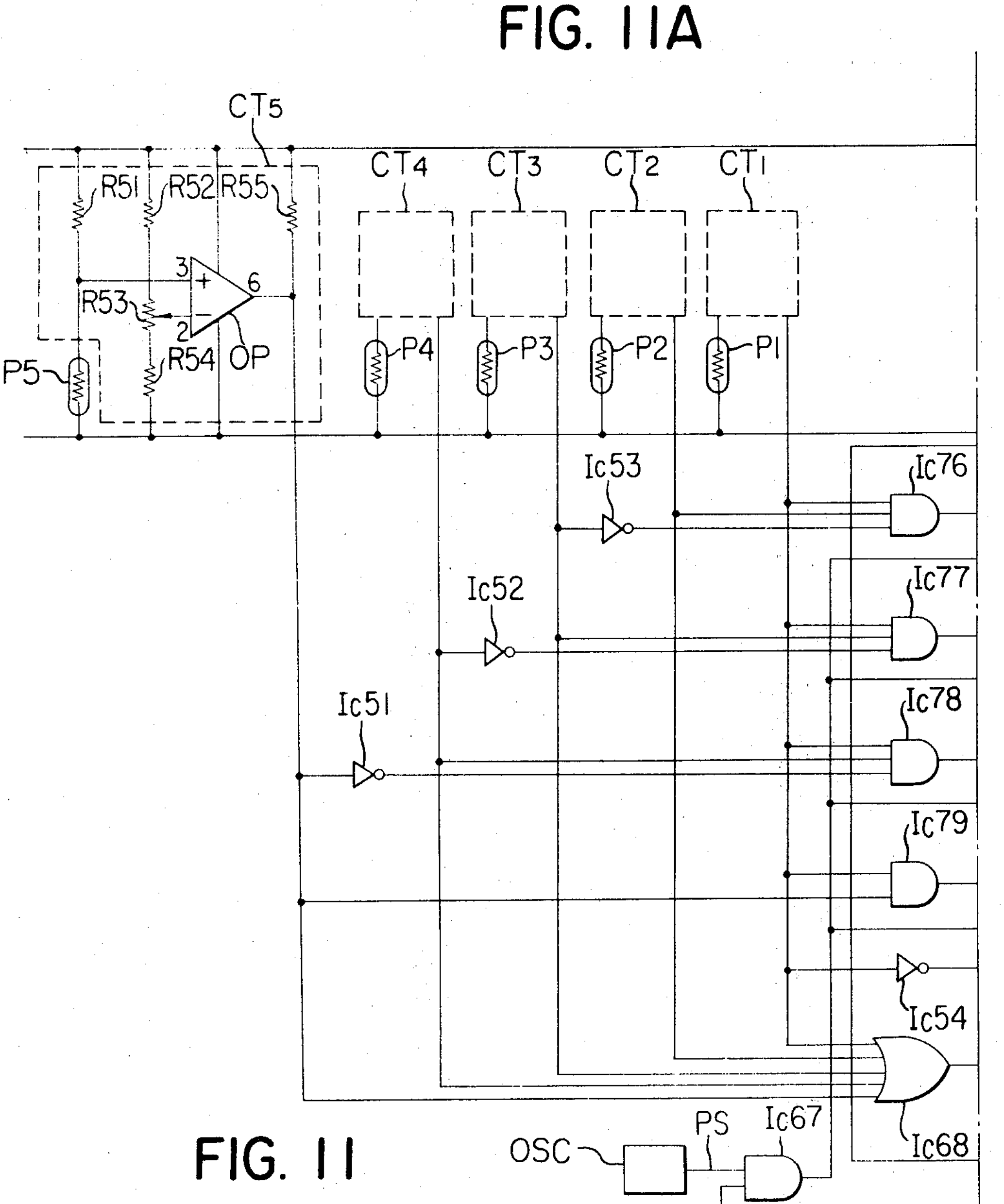
FIG. 11 is a second embodiment of the circuit diagram for the second reproduction apparatus.
Figure 11:
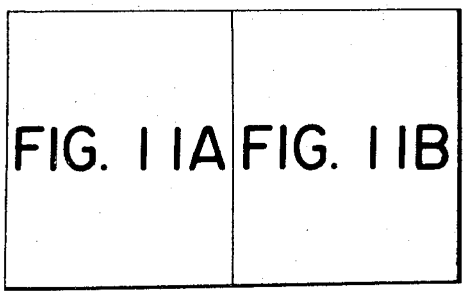
Figure 11B:
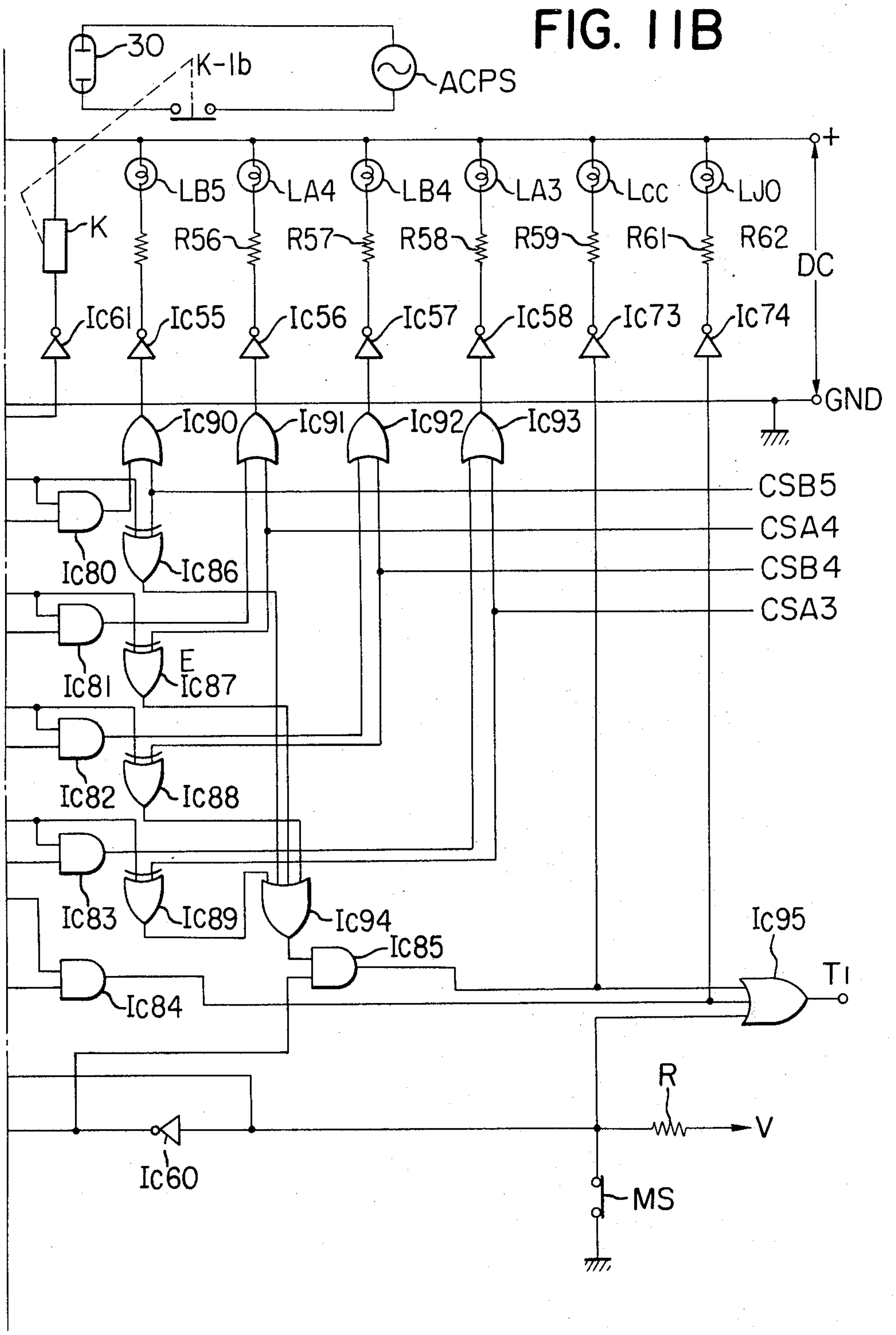

In the following, explanations will be made in reference to the second embodiment of the indicating and driving circuit for the second reproduction apparatus shown in FIG. 11 as to a method of prohibiting the copying operation when the cassette size and the original image size are not met, or when the original image is not placed on the right position. In the circuit of FIG. 11, those parts designated by the same reference numerals and symbols as those shown in FIG. 9 have the same functions.

Assume that an original image in B-5 size is regularly placed on the original mounting glass, the original fixing plate 101-1 is lowered down to fix the image in position, and the cassette in A-4 size is selected. In this case, a cassette size signal CSA4 is at the level H, and the lamp LA4 is constantly lit through the OR gate Ic91, the inverter Ic56, and the resistor R57, while the other cassette size signals are at the level L. Since the B-5 size original is regularly placed on the original mounting glass, the AND gate Ic76 takes its output level H, while the remaining AND gates Ic77 to Ic79 and Ic81 to Ic84 take their output level L. In this consequence, when either of the inputs at the exclusive OR gates Ic86 and Ic87 takes the level H, the output thereof also takes the level H. Also, the inputs at the remaining exclusive OR gates Ic88 and Ic89 take the level L, hence their outputs also take the level L. Accordingly, the output of the OR gate Ic94 is at the level H and the output of the inverter Ic60 is at the level H, hence the output of the AND gate Ic85 takes the level H and the lamp LCC is turned on. The AND gate Ic80 is applied at one of its input terminals with an output from the AND gate Ic76, and at the other input terminals thereof with the pulse signal PS, hence the output from this gate Ic80 repeats its output level H and L alternately. The output from the AND gate Ic80 is introduced into one of the input terminals of the OR gate Ic90 as an input thereto. The other input terminal of the OR gate Ic90 is applied with a cassette size signal CSB5. Since the cassette size signal CSB5 is at the level L, the lamp LB5 is turned on and off, and the lamp LCC is lit on the operating panel to indicate, for example, "REPLACE WINKING CASSETTE". Since the output from the AND gate Ic85 is connected to the OR gate Ic95, the terminal T1 thereof is at the level H. The terminal T1 is for leading out an output for prohibiting the copying operation, when the terminal takes the level H, as in those cases wherein a jam signal enters into the apparatus, or the image transfer paper is exhausted in the cassette, and a paper exhaustion signal prohibits the copying operation. At this juncture, when the operator changes the cassette size into B-5, the cassette size signal CSB5 takes the level H and the remaining cassette size signals take the level L. In this consequence, since the exclusive OR gates Ic86 to Ic89 all take the output level L, the output from the OR gate Ic94 also takes the level L and the terminal T1 also takes the level L. Accordingly, unless the jam signal or the paper exhaustion signal is introduced as the input thereto, the copying operation can be started by depression of the copying button 32-2 or 33-2. Incidentally, the lamp LCC does not light up.

The OR gate Ic95 is also applied with an input signal from the abovementioned microswitch, so that, even if the original fixing plate 101-1 is not lowered down, a copy operation prohibiting signal is led out to the terminal T1.

Further, when the original image is not placed at the right position, the output from the AND gate Ic84 is at the level H, hence the lamp LJO is turned on through the inverter Ic74. This lamp LJO indicates on the operating panel such as, for example, "PLACE THE ORIGINAL AT THE RIGHT POSITION". The output from the AND gate Ic84 is introduced into the OR gate Ic95 as an input thereto to thereby prohibit starting of the copying operation.

The above-described embodiment is so constructed that the copying operation can first be started when (a) the cassette size and the original image size are just matched, (b) the original is placed at the right position, and (c) the original mounting table is closed by the original fixing plate.

According to the foregoing explanations of the embodiments according to the present invention, the copying operation is made possible, only when the above three conditions are fulfilled, although it is still possible to carry out the copying operation when only one condition is fulfilled.

Further, in the embodiments of the present invention, the image recording member is accommodated in a cassette. However, the invention is also applicable to the recording apparatus of a type, in which the image of the original is transferred onto a sheet of paper cut out from a rolled paper material.

Furthermore, in the embodiments of the present invention, only the original image size has been mentioned as the shape of the image to be reproduced. However, even with a facsimile image or a reproduction apparatus capable of changing the image magnification, if the shape of the image can be automatically detected, such image shape can be notified by the detected signal. In addition, the fact that the image shape does not conform to the image recording member and, further, an adequate image recording member conforming to the original image shape can be notified. Also, it is possible to prohibit the image recording operation when the original image size does not conform to the image recording member.

As stated in the foregoing, according to the second embodiment of the present invention, the shape of the image to be recorded can be automatically detected and indicated to the operator, hence erroneous copying operations can be reduced. Also, when the shape of the image recording member and the shape of the original image to be recorded are not met, the operator who is notified of this can easily replace the image recording member. Further, when the conformance of the shape of the original image to the image recording member is indicated, the operator can immediately select the image recording member to be replaced. Furthermore, when the image recording is prohibited in case the shape of the original image is not conformed with the shape of the image recording member, erroneous recording operations can be totally eliminated as far as the shape of the image recording member is concerned. Moreover, according to the embodiment of the present invention, the size of the original image can be recognized when the original fixing plate is placed on the original image, either before or during the recording operation, and whether the original image is placed at the right position, or not, can also be recognized, so that the utility of the apparatus is remarkable.

What is claimed is:

1. A recording apparatus comprising:

(a) an image recording member, on which an image is to be recorded;

(b) means for recording the image on the image recording member;

(c) means for controlling the operations of said recording means, wherein said control means includes magnification mode means for controlling said recording means to form an image on said image recording member of a size which has been selectively changed from the size of the original;

(d) output signal means for producing an output signal related to the size of said image recording member;

(e) manual selection means for actuation to provide a signal related to the size of the image;

(f) discriminating means coupled to said output signal means and said manual selection means for determining whether the size of the image recording member conforms to the size of said image; and (g) indicating means coupled to said discriminating means for indicating conformance or nonconformance of the sizes of said image recording member and said image to be recorded thereon.

2. The recording apparatus as claimed in claim 1, wherein said controlling means includes copy process prohibiting means coupled to said discriminating means for prohibiting image recording by said recording means, when the size of said image recording member does not conform to the size of said image.

3. The recording apparatus as claimed in claim 1, wherein the output from said image recording member output signal means is coupled as an input to said control means.

4. The recording apparatus as claimed in claim 1, wherein said control means further includes a one-to-one mode control means which controls said recording means so as to form an image on said image recording member of a size substantially equal to that of the original.

5. The recording apparatus as claimed in claim 1, further comprising means for designating a recording member size which corresponds to the size of said image.

6. The recording apparatus as claimed in claim 4, further comprising:

(a) recording means which carries out recording of the image on said image recording member;

(b) control means which controls the operations of said recording means;

(c) detecting means which detects the shape of said original image; and (d) means for designating a recording member size which corresponds to the size of said original image.

7. The recording apparatus as claimed in claim 1, wherein said controlling means includes copy process prohibiting means coupled to said discriminating means for prohibiting image recording by said recording means, when the size of said image recording member does not conform to the size of said original image.

8. The recording apparatus as claimed in claim 1, wherein said control means further includes a one-to-one mode control means which controls said recording means so as to form an image on said image recording member of a size substantially equal to that of the original image.

9. A recording apparatus comprising:

(a) an image recording member, on which an image is to be recorded;

(b) means for recording the original image on said image recording member;
(c) control means for controlling the operation of said recording means;
(d) output signal means for producing an output signal related to the size of said image recording member;
(e) detecting means which detects the size of said image;
(f) discriminating means coupled to said output signal means and said detecting means for determining whether or not the size of said image recording means conforms to the size of the original image; and
(g) indicating means coupled to said discriminating means for indicating conformance or nonconformance of the sizes of said image recording member and said original image.

10. The recording apparatus as claimed in claim 9, wherein said controlling means includes copy process prohibiting means coupled to said discriminating means for prohibiting image recording by said recording means, when the size of said image recording member does not conform to the size of said original image.

11. The recording apparatus as claimed in claim 9, wherein the output from said image recording member output signal means is coupled as an input to said control means.

12. The recording apparatus as claimed in claim 9, wherein said control means includes a magnification mode control means which controls said recording means so as to form an image on said image recording member of a size which has been changed from the size of the original image.

13. The recording apparatus as claimed in claim 12, wherein said control means further includes a one-to-one mode control means which controls said recording means so as to form an image on said image recording member of a size substantially equal to that of the original image.

14. A recording apparatus comprising:
(a) an image recording member, on which an image is to be recorded;
(b) means for recording the image on said image recording member;
(c) control means for controlling the operations of said recording means, wherein said control means includes magnification mode means for controlling said recording means to form an image on said image recording member of a size which has been selectively changed from the size of the original;
(d) output signal means for producing an output signal related to the size of said image recording member;
(e) manual selection means for adjustment to provide a signal related to the size of said image;
(f) discriminating means coupled to said recording member output signal means and said manual selection means for determining whether or not the size of said image recording member conforms to the size of said image; and
(g) means coupled to said discriminating means for providing an indication when said discriminating means detects non-conformance of the sizes of the image recording member and the original image.

15. The recording apparatus as claimed in claim 14, wherein said controlling means includes copy process prohibiting means coupled to said discriminating means for prohibiting image recording by said recording means, when the size of said image recording member does not conform to the size of said original image.

16. The recording apparatus as claimed in claim 14, wherein the output from said image recording member output signal means is coupled as an input to said control means.

17. The recording further apparatus as claimed in claim 14, wherein said control means includes a one-to-one mode control means which controls said recording means so as to form an image on said image recording member of a size substantially equal to that of the original.

18. A recording apparatus comprising:
(a) an image recording member, on which an image is to be recorded;
(b) recording means for recording the image on said image recording member;
(c) control means for controlling the operations of said recording means;
(d) output signal means for producing an output signal related to the size of said image recording member;
(e) means for detecting the size of said image;
(f) discriminating means coupled to said recording member output signal means and said detection means for determining whether or not the size of said image recording member conforms to the size of the image; and
(g) means coupled to said discriminating means for providing an indication when said discrimination means determines non-conformance of the sizes of said image recording member and said image.

19. The recording apparatus as claimed in claim 11, wherein said controlling means includes copy process prohibiting means coupled to said discriminating means for prohibiting image recording by said recording means, when the size of said image recording member does not conform to the size of said image.

20. The recording apparatus as claimed in claim 11, wherein the output from said image recording member output signal means is coupled as an input to said control means.

21. The recording apparatus as claimed in claim 11, wherein said control means includes a magnification mode control means which controls said recording means so as to form an image on said image recording member of a size which has been changed from the size of the original image.

22. The recording apparatus as claimed in claim 21, wherein said control means further includes a one-to-one mode control means which controls said recording means so as to form an image on said image recording member of a size substantially equal to that of the original image.

23. A recording apparatus comprising:
(a) an image recording member, on which an image is to be recorded;
(b) means for recording the image on said image recording member;
(c) control means for controlling the operations of said recording means, wherein said control means includes magnification mode means for controlling said recording means to form an image on said image recording member of a size which has been selectively changed from the size of the original;

(d) output signal means for producing an output signal related to the size of said image recording member;

(e) manual selection means for adjustment to provide a signal related to the size of said image;

(f) discriminating means coupled to said recording member output signal means and said manual selection means for determining whether or not the size of said image recording member conforms to the size of said image;

(g) indicating means coupled to said discriminating means for indicating conformance or non-conformance of the sizes of the image recording member and the original image; and (h) means coupled to said discriminating means for providing an indication when said discriminating means detects non-conformance of the sizes of said image recording member and said original image.

24. The recording apparatus as claimed in claim 23, wherein the output from said image recording member output signal means is coupled as an input to said control means.

25. A recording apparatus comprising:

(a) an image recording member, on which an image is to be recorded;

(b) means for recording the image on said image recording member;

(c) control means for controlling the operations of said recording means;

(d) output signal means for producing an output signal related to the size of said image recording member;

(e) means for detecting the size of said original image;

(f) discriminating means coupled to said recording member output signal means and said detecting means for determining whether or not the size of said image recording member conforms to the size of said image;

(g) indicating means coupled to said discriminating means for indicating conformance or non-conformance of the sizes of the image recording member and the original image; and (h) means coupled to said discriminating means for providing an indication when said discrimination means detects non-conformance of the sizes of said image recording member and original image.

26. The recording apparatus as claimed in claim 25, wherein said control means includes copy process prohibiting means coupled to said discriminating means for prohibiting image recording by said recording means, when the size of said image recording member does not conform to the size of said original image.

27. The recording apparatus as claimed in claim 25, wherein the output from said image recording member output signal means is coupled as an input to said control means.

28. The recording apparatus as claimed in claim 25, wherein said control means includes a magnification mode control means which controls said recording member of a size which has been changed from the size of the original image.

29. The recording apparatus as claimed in claim 28, wherein said control means further includes a one-to-one mode control means which controls said recording means so as to form an image on said image recording member of a size substantially equal to that of the original image.

30. A recording apparatus comprising:

(a) an image recording member, on which an image is to be recorded;

(b) means for recording the image on said image recording member;

(c) one-to-one control means for controlling said recording means in a first mode of operation to form an image on said image recording member of a size substantially equal to that of the original image;

(d) magnification change control means for controlling said recording means in a second mode of operation to form an image on said image recording member of a size having a changed magnification from that of the original image;

(e) means, mounted on an operation panel, for selecting between said first and second modes of operations; and (f) first and second accommodating means each of which accommodates the same size of image recording members, both of said accommodating means being attached to the apparatus so as to orient the image recording members from said first and second accommodating means differently with respect to the running direction within the recording apparatus;

wherein when said selecting means selects the first mode of operation, said first accommodating means is selectively used, and when said selecting means selects the second mode of operation, said second accommodating means is selectively used.

31. A recording apparatus as claimed in claim 30 further comprising means for indicating the running direction of said image recording member.

32. A recording apparatus comprising:

(a) an image recording member, on which an image is to be recorded;

(b) means for recording in the image on said image recording member;

(c) a plurality of magnification change control means for controlling said recording means to form an image on said image recording member of a size having a changed magnification from that of the original image in accordance with a selection between magnification modes of operation;

(d) means, mounted on an operation panel, for selecting among said magnification modes of operation; and (e) first and second accommodating means each of which accommodates the same size of image recording members, and being attached to the apparatus so as to orient the image recording members from said first and second accommodating means differently with respect to the running direction within the recording apparatus;

wherein said first and second accommodating means are selectively used in accordance with the selection of the magnification modes of said selecting means.

33. A recording apparatus as claimed in claim 32 further comprising means for indicating the running direction of said image recording member.

34. A recording apparatus comprising:

(a) an image recording member, on which an image is to be recorded;

(b) means for recording the image on said image recording member;

(c) one-to-one mode control means for controlling said recording means in a first mode of operation to form an image on said image recording member of a size substantially equal to that of said original image;

(d) a plurality of magnification change mode control means for controlling said recording means in a second mode of operation to form an image on said image recording member of a size having a changed magnification from that of the original image;

(e) one-to-one designation means for designating control in accordance with said first mode of operation;

(f) magnification change designation means for designating control in accordance with said second mode of operation;

(g) magnification change limiting means which restricts operation of said plurality of magnification change mode control means to a selected one; and (h) prohibiting means coupled to said magnification change limiting means for prohibiting the selection of one of said magnification change mode control means, when said one-to-one designation means is designated.

35. The recording apparatus as claimed in claim 34, further comprising masking means for covering said magnification change limiting means while said one-to-one designating means is designated.

36. The recording apparatus as claimed in claim 34, wherein said masking member is disposed in a closed state during operation of said one-to-one mode control means, and is disposed in an open state while said magnification change mode control means is operative to enable actuation of said magnification change limiting means.

37. The recording apparatus as claimed in claim 34, further comprising means for releasing said magnification change designating means when said recording means has completed a predetermined sequence of operations.

38. The recording apparatus as claimed in claim 37, wherein said releasing means operates when the power source for the recording apparatus is in an "off" state.

39. The recording apparatus as claimed in claim 34, further comprising means for releasing said magnification change designating means at the conclusion of a predetermined time period after termination of the magnification change recording operations by said recording means.

40. The recording apparatus as claimed in claim 36, further comprising means for closing said masking member when said recording means have completed a predetermined sequence of operations, thereby designating the one-to-one recording mode.

41. The recording apparatus as claimed in claim 36, further comprising means for closing said masking member when the power supply for said apparatus is in an "off" state.

42. The recording apparatus as claimed in claim 34, further comprising means for releasing said magnification change designating means at the conclusion of a predetermined time period after termination of the magnification change recording operations by said recording means.

43. The recording apparatus as claimed in claim 36, wherein at least a part of said masking member is made of a light transmitting member which renders visible said magnification change limiting means.

44. A recording apparatus comprising:

(a) a plurality of image recording members, on which images are to be recorded;

(b) means for recording respective images on said image recording members;

(c) image recording member designating means for designating a selected size of a said image recording member;

(d) a plurality of cassette accommodating means which respectively accommodate therein said different sized image recording members;

(e) cassette designating means for designating one of said plurality of cassette accommodating means; and (f) means for controlling the operations of said recording means.

45. The recording apparatus as claimed in claim 44, further comprising one-to-one mode control means for controlling said recording means so as to form an image on a said recording member of a size substantially equal to that of the original image on said image recording member, and magnification change mode control means for controlling said recording means so as to form an image on a said recording member of a size having magnification changed from the size of the original image.

46. The recording apparatus as claimed in claim 45, wherein, at the time of the recording operation by said one-to-one mode control means, said image recording member is designated by said cassette designating means, and, at the time of the recording operation by said magnification change mode control means, said image recording member is designated by said image recording member designating means.

47. A recording apparatus comprising:

(a) an image recording member, on which an original image is to be recorded;

(b) recording means for recording the image on said image recording member;

(c) means for controlling operations of said recording means;

(d) a mounting table for mounting thereon said original image;

(e) position designating markings disposed on said original mounting table, along which said original image is to be placed;

(f) original image position discriminating means for determining whether or not said original image is accurately aligned on said designated position for each different sized original; and (g) display means coupled to said discriminating means for indicating whether or not said original image is placed at said designated position.

48. The recording apparatus as claimed in claim 47, wherein said control means includes means for prohibiting the operations of said recording means when said original image is misplaced on said designated position.

49. The recording apparatus as claimed in claim 48, further comprising a movable image original holding means for disposition in a closed state to press-hold said original on said mounting table and wherein said control means prohibits the operations of said recording means when said original image fixing means is not in said closed state.

50. A recording apparatus comprising:

(a) an image recording member, on which an image is to be recorded;

(b) means for recording the image on said image recording member;

(c) control means including one-to-one mode control means for operation to control said recording means to form an image on said recording member of a size substantially equal to that of the original image, and magnification change mode control means for operation to control said recording means to form an image on said recording member of a size having a changed magnification from that of the original image;

(d) output signal means for producing an output signal related to the size of said image recording member;

(e) manual selection means for designating the size of said image, when the control by said magnification change mode control means is in operation;

(f) warning means for emitting a warning signal during said operation of said magnification change means, when the size of the image is not designated by said manual selection means; and (g) means for prohibiting recording by said recording means when the size of the image is not designated by said manual selection means.

51. A recording apparatus comprising:

(a) a plurality of different size image recording members, on which images are to be recorded;

(b) means for recording the image on a said image recording member;

(c) means for controlling the operations of said recording means;

(d) image recording member designating means for designating the size of a said image recording member;

(e) a plurality of cassette accommodating means which accommodate therein said different size image recording members;

(f) cassette designating means for designating one of said plurality of cassette accommodating means; and (g) designation prohibiting means for prohibiting the designation by said cassette designating means during operation of said image recording member designating means, and for prohibiting designation by said image recording member designating means during operation of said cassette designating means.

52. A recording apparatus comprising:

(a) a plurality of different size image recording members, on which images are to be recorded;

(b) means for recording the image on a said image recording member;

(c) image recording member designating means for designating the size of said image recording member;

(d) a plurality of cassette accommodating means which accommodate therein said different size image recording members;

(e) cassette designating means for designating one of said plurality of cassette accommodating means;

(f) control means including one-to-one mode control means for operation to control said recording means to form an image on a said recording member of a size substantially equal to that of the original image; including magnification change mode control means for operation to control said recording means to form an image on a said recording member of a size having a changed magnification from that of the original image,; and, including designation control means which energizes said cassette designating means during operation of said one-to-one mode control means, and which energizes each image recording member designating means during operation of said magnification change mode control means;

(g) discriminating means for determining whether or not the size of said image recording member designated by said image recording member designating means conforms to the respective sizes of said image recording members accommodated in said plurality of cassette accommodating means; and (h) selection means for selecting said cassette accommodating means which accommodates therein the appropriate image recording member, when said discriminating means determines the conformance.

* * * * *

UNITED STATES PATENT AND TRADEMARK OFFICE
CERTIFICATE OF CORRECTION

PATENT NO. : 4,302,098

DATED : November 24, 1981

INVENTOR(S) : YASUHITO KAN, ET AL.

It is certified that error appears in the above-identified patent and that said Letters Patent is hereby corrected as shown below:

Column 2, line 21, "changing" should read --change--;
line 34, "other" should read --another--;
line 44, "other" should read --another--.

Column 4, line 48, "direction" should read --directions--.

Column 5, line 14, "alignment" should read --alignments--.

Column 7, line 14, insert --be-- after "can";
line 19, after "with" insert --the--.

Column 9, line 54, after "maximum" insert --size--.

Column 11,line 32, "gate" should read --gates--.

Column 15,line 55, "relevent" should read --relevant--.

Column 20,line 60, "LB2" should read --LB5--.

Column 24,lines 43 - 53, Claim 6, should read as follows:

--The recording apparatus as claim in claim 4, further comprising:

means for designating a recording member size which corresponds to the size of said original image.--

UNITED STATES PATENT AND TRADEMARK OFFICE
CERTIFICATE OF CORRECTION

PATENT NO. : 4,302,098

DATED : November 24, 1981

INVENTOR(S) : YASUHITO KAN, ET AL.

It is certified that error appears in the above-identified patent and that said Letters Patent is hereby corrected as shown below:

Column 26, line 35, Claim 19, "11" should read --18--;
line 41, Claim 20, "11" should read --18--;
line 45, Claim 21, "11" should read --18--.

Column 28, line 37, Claim 32, delete "in".

Column 29, line 28, Claim 36, "34" should read --35--.

Signed and Sealed this

*Twelfth* Day of *April 1983*

[SEAL]

*Attest:*

GERALD J. MOSSINGHOFF

*Attesting Officer* *Commissioner of Patents and Trademarks*